(12) United States Patent
Nakamura

(10) Patent No.: US 11,138,655 B2
(45) Date of Patent: Oct. 5, 2021

(54) AUCTION INFORMATION PROCESSING DEVICE AND AUCTION INFORMATION PROCESSING METHOD

(75) Inventor: Kentaro Nakamura, Shinagawa-ku (JP)

(73) Assignee: Rakuten Group, Inc., Tokyo (JP)

( * ) Notice: Subject to any disclaimer, the term of this patent is extended or adjusted under 35 U.S.C. 154(b) by 1076 days.

(21) Appl. No.: 14/112,770

(22) PCT Filed: Dec. 28, 2011

(86) PCT No.: PCT/JP2011/080435
§ 371 (c)(1),
(2), (4) Date: Oct. 18, 2013

(87) PCT Pub. No.: WO2012/147238
PCT Pub. Date: Nov. 1, 2012

(65) Prior Publication Data
US 2014/0046791 A1    Feb. 13, 2014

(30) Foreign Application Priority Data
Apr. 28, 2011   (JP) .............................. JP2011-100973

(51) Int. Cl.
*G06Q 30/00*   (2012.01)
*G06Q 30/08*   (2012.01)
*G06Q 30/06*   (2012.01)

(52) U.S. Cl.
CPC ............ *G06Q 30/08* (2013.01); *G06Q 30/06* (2013.01); *G06Q 30/0601* (2013.01); *G06Q 30/0641* (2013.01)

(58) Field of Classification Search
CPC . G06Q 30/0244; G06Q 30/0601–0645; G06Q 30/80; G06Q 30/06–08
(Continued)

(56) References Cited

U.S. PATENT DOCUMENTS 8,266,009 B1 * 9/2012 Devlin ................... G06Q 40/00
                                                    705/26.3
2001/0053995 A1   12/2001 Nishimoto
(Continued)

FOREIGN PATENT DOCUMENTS

JP    2001-344457 A    12/2001
JP    2002-007790 A     1/2002
(Continued)

OTHER PUBLICATIONS

Busch, Jason, Japanese vs. Dutch Reverse Auctions, Oct. 5, 2009, SpendMatters, accessed at [https://spendmatters.com/2009/10/05/japanese-vs-dutch-reverse-auctions/] (Year: 2009).*
(Continued)

*Primary Examiner* — Jeffrey A. Smith
*Assistant Examiner* — Lindsey B Smith
(74) *Attorney, Agent, or Firm* — Sughrue Mion, PLLC

(57) ABSTRACT

There are provided an information processing device, an information processing method, an information processing program, and a recording medium having the information program recorded therein which can present, to a seller, information which enables a setting of, for example, adequate putting-up conditions according to a putting-up purpose of an item. The information processing device acquires transaction history information of an item related to item information of an item specified by a seller for putting-up, from a database which stores transaction history information of items put up in the past. Further, the information processing device extracts transaction history information of other items which suit to a putting-up purpose of the item by the seller, as suited transaction history information, from the extracted transaction history information. Furthermore, the information processing device generates presentation information which indicates a sample of input content of setting (Continued)

items set in an input form by the seller for putting-up, based on the extracted suited transaction history information, and transmits the presentation information to the terminal device.

21 Claims, 10 Drawing Sheets

(58) Field of Classification Search
USPC .................................................. 705/26.1–27.2
See application file for complete search history.

(56) References Cited

U.S. PATENT DOCUMENTS

| | | | | |
|---|---|---|---|---|
| 2003/0055773 | A1* | 3/2003 | Guler | G06Q 30/08 |
| | | | | 705/37 |
| 2007/0087756 | A1* | 4/2007 | Hoffberg | G06Q 20/40 |
| | | | | 455/450 |
| 2008/0133305 | A1* | 6/2008 | Yates | G06Q 10/08 |
| | | | | 705/14.4 |
| 2008/0215456 | A1* | 9/2008 | West | G06Q 30/0613 |
| | | | | 705/26.41 |
| 2013/0073410 | A1* | 3/2013 | Bhogal | G06Q 30/08 |
| | | | | 705/26.3 |

FOREIGN PATENT DOCUMENTS

| | | |
|---|---|---|
| JP | 2002-352115 A | 12/2002 |
| JP | 2003-316975 A | 11/2003 |
| JP | 2005-107952 A | 4/2005 |
| JP | 2008-134681 A | 6/2008 |
| JP | 2011-043970 A | 3/2011 |

OTHER PUBLICATIONS

Japanese Office Action for JP 2011-100973 dated Sep. 17, 2013.

* cited by examiner

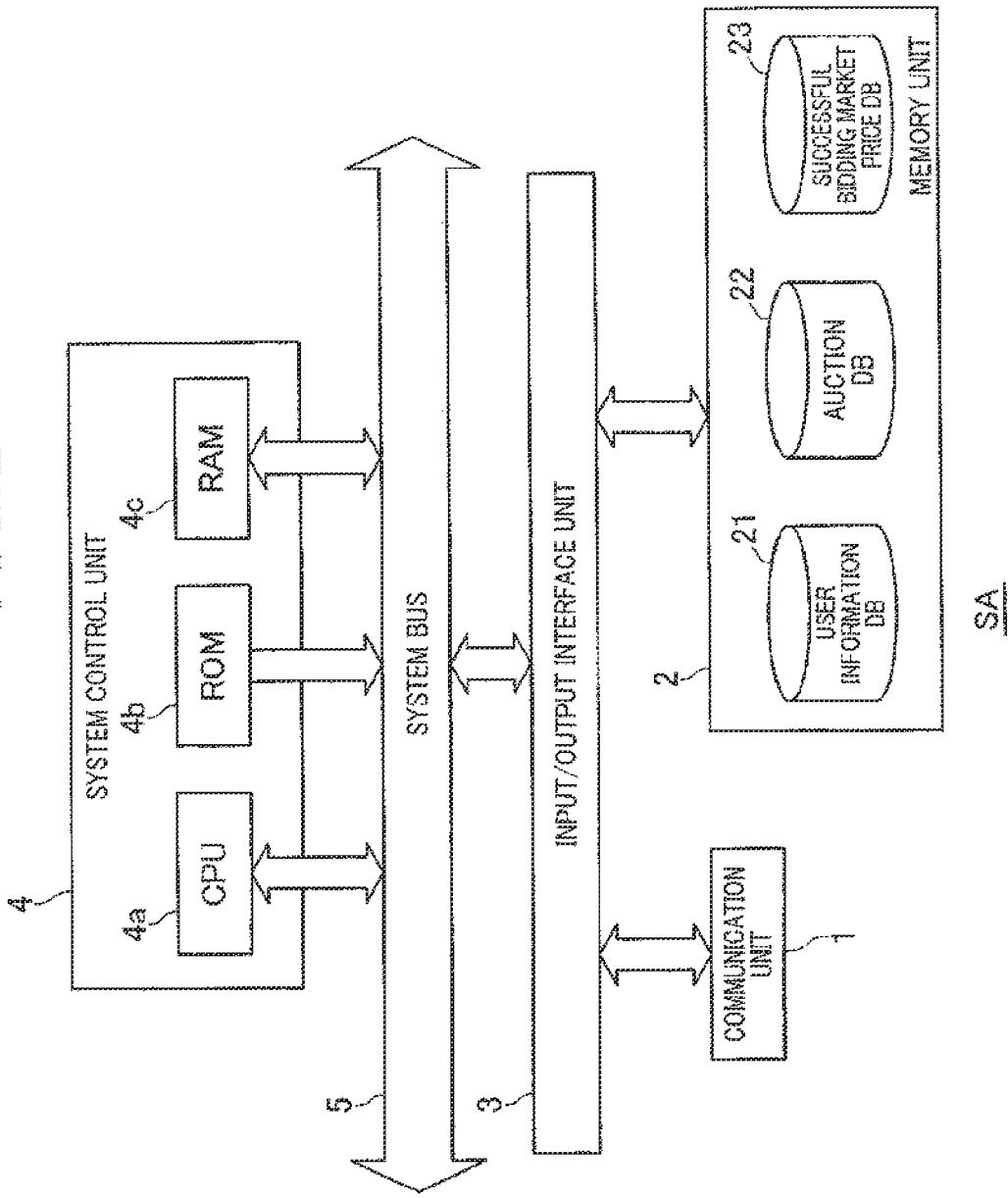

FIG.3A

| USER INFORMATION DB |
|---|
| USER ID |
| LOG-IN ID |
| PASSWORD |
| NICKNAME |
| NAME |
| GENDER |
| AGE |
| HOBBY |
| ADDRESS |
| TELEPHONE NUMBER |
| MAIL ADDRESS |
| ... |

| AUCTION DB | |
|---|---|
| AUCTION ID | |
| PUTTING-UP INFORMATION | USER ID OF SELLER |
| | ITEM NAME |
| | GENRE |
| | ITEM NUMBER |
| | DESCRIPTION OF ITEM |
| | START PRICE |
| | BUY-IT-NOW PRICE |
| | START TIME |
| | END TIME |
| | DELIVERY METHOD |
| | ...... |
| BIDDING INFORMATION | USER ID OF BIDDER |
| | BIDDING PRICE |
| | BIDDING DATE |
| | ...... |
| SUCCESSFUL BIDDING INFORMATION | USER ID OF SUCCESSFUL BIDDER |
| | SUCCESSFUL BIDDING PRICE |
| | SUCCESSFUL BIDDING DATE AND TIME |
| | ...... |

| SUCCESSFUL BIDDING MARKET PRICE DB |
|---|
| ITEM NAME |
| GENRE |
| ITEM NUMBER |
| SUCCESSFUL BIDDING MARKET PRICE |

― 23

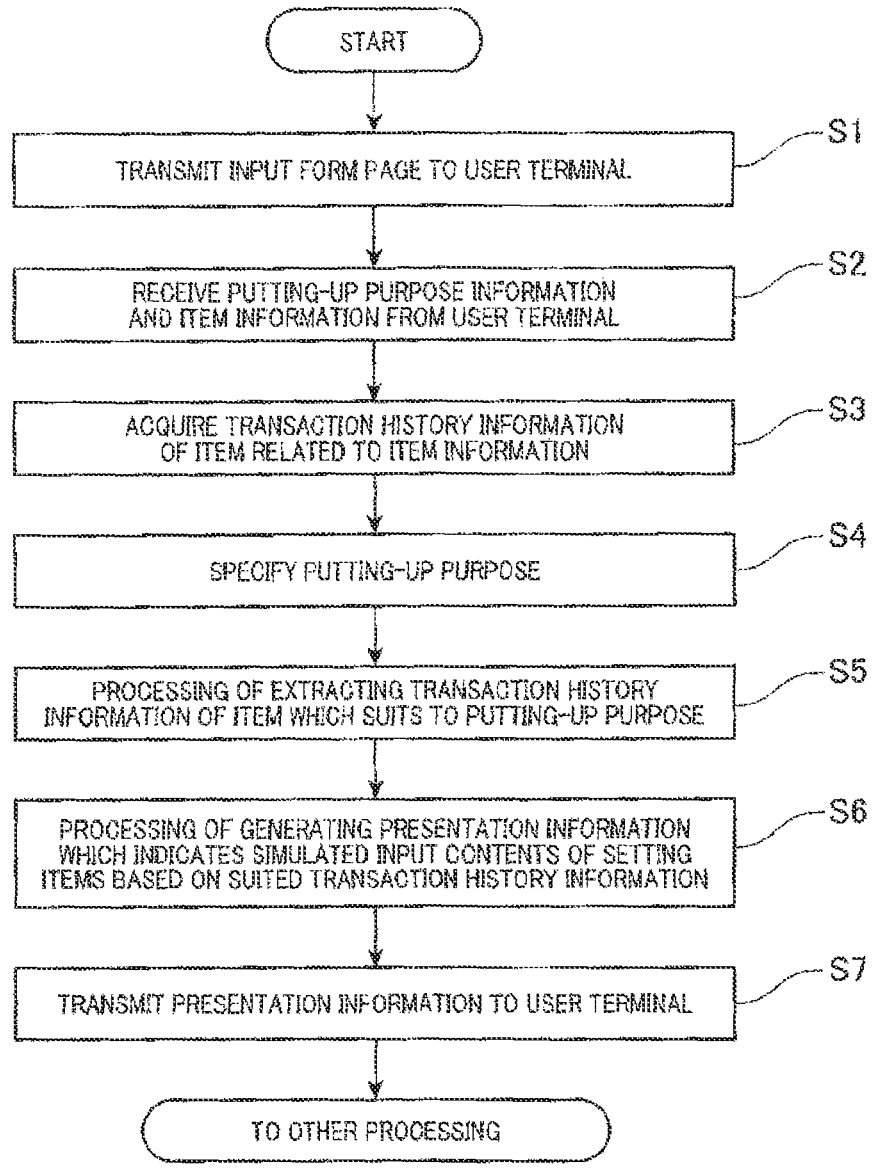

FIG.5

| | | |
|---|---|---|
| PUTTING-UP PURPOSE | [SUCCESSFUL BIDDING PRICE MAXIMIZATION / EARLY BIDDING / SELLOUT / ..........] ▽ | ← 51a |

SETTING ITEM

51b {
- GENRE [_____] (GENRE SELECTION)
- ITEM NAME [_____]
- CONDITIONS OF ITEM  ○ NEW   ⊙ SECONDHAND
- DESCRIPTION OF ITEM [_____]
- START PRICE [_____] YEN
- BUY-IT-NOW PRICE [_____] YEN
- NUMBER OF PUT-UP ITEMS [____] ITEMS
- START TIME [__]▽YEAR [__]▽MONTH [__]▽DAY FROM[__]▽O'CLOCK LEVEL
- END TIME [__]▽YEAR [__]▽MONTH [__]▽DAY BY[__]▽O'CLOCK LEVEL
- CONFIRMATION OF STOCKS  ⊙ YES   ○ NO
- NUMBER OF TIMES OF AUTOMATIC RE-PUTTING-UP [____] TIMES
- AUTOMATIC EXTENSION  ⊙ YES   ○ NO
- DELIVERY METHOD
  ANONYMOUS DELIVERY: YOU CAN SHIP ITEM TO SUCCESSFUL BIDDER WITHOUT SHOWING PERSONAL INFORMATION
  ☐ ABC DELIVERY     [▼ DELIVERY METHOD SELECTION ▽]
  ☐ POSTAL SERVICE   [▼ DELIVERY METHOD SELECTION ▽]
  ☐ T EXPRESS        [▼ DELIVERY METHOD SELECTION ▽]
  NORMAL DELIVERY: AFTER SUCCESSFUL BIDDER FINISHES PAYMENT, YOU SHOW YOUR PERSONAL INFORMATION AND PERFORM TRANSACTION
  ☐ ABC DELIVERY     [▼ DELIVERY METHOD SELECTION ▽]
  ☐ POSTAL SERVICE   [▼ DELIVERY METHOD SELECTION ▽]
  ☐ T EXPRESS        [▼ DELIVERY METHOD SELECTION ▽]
  FREE SHIPPING
  ☐ FREE SHIPPING (SELLER PAYS SHIPPING FEE)

......

( CONFIRM ) ← 51c

| | | |
|---|---|---|
| PUTTING-UP PURPOSE | SUCCESSFUL BIDDING PRICE MAXIMIZATION ▽ | ~51a |

SETTING ITEM

| | |
|---|---|
| GENRE | WRIST WATCH >> MEN'S WATCH >> ANNA  (GENRE SELECTION) |
| ITEM NAME | XYZ WATCH |
| CONDITIONS OF ITEM | ○ NEW    ⦿ SECONDHAND |
| DESCRIPTION OF ITEM | [          ] |
| START PRICE | [1] YEN |
| BUY-IT-NOW PRICE | [10000] YEN |
| NUMBER OF PUT-UP ITEMS | [  ] ITEMS |
| START TIME | [2011]▽YEAR [4]▽MONTH [2]▽DAY  FROM [9]▽O'CLOCK LEVEL |
| END TIME | [2011]▽YEAR [4]▽MONTH [3]▽DAY  BY [22]▽O'CLOCK LEVEL |
| CONFIRMATION OF STOCKS | ○ YES    ⦿ NO |
| NUMBER OF TIMES OF AUTOMATIC RE-PUTTING-UP | [  ] TIMES |
| AUTOMATIC EXTENSION | ⦿ YES    ○ NO |
| DELIVERY METHOD | ANONYMOUS DELIVERY: YOU CAN SHIP ITEM TO SUCCESSFUL BIDDER WITHOUT SHOWING PERSONAL INFORMATION |
| | ☑ ABC DELIVERY    UP TO 60 cm  ▽ |
| | ☐ POSTAL SERVICE  ▽ DELIVERY METHOD SELECTION ▽ |
| | ☐ T EXPRESS       ▽ DELIVERY METHOD SELECTION ▽ |
| | NORMAL DELIVERY: AFTER SUCCESSFUL BIDDER FINISHES PAYMENT, YOU SHOW YOUR PERSONAL INFORMATION AND PERFORM TRANSACTION |
| | ☑ ABC DELIVERY    UP TO 60 cm  ▽ |
| | ☐ POSTAL SERVICE  ▽ DELIVERY METHOD SELECTION ▽ |
| | ☐ T EXPRESS       ▽ DELIVERY METHOD SELECTION ▽ |
| | FREE SHIPPING |
| | ☑ FREE SHIPPING (SELLER PAYS SHIPPING FEE) |

( CONFIRM ) ~51c

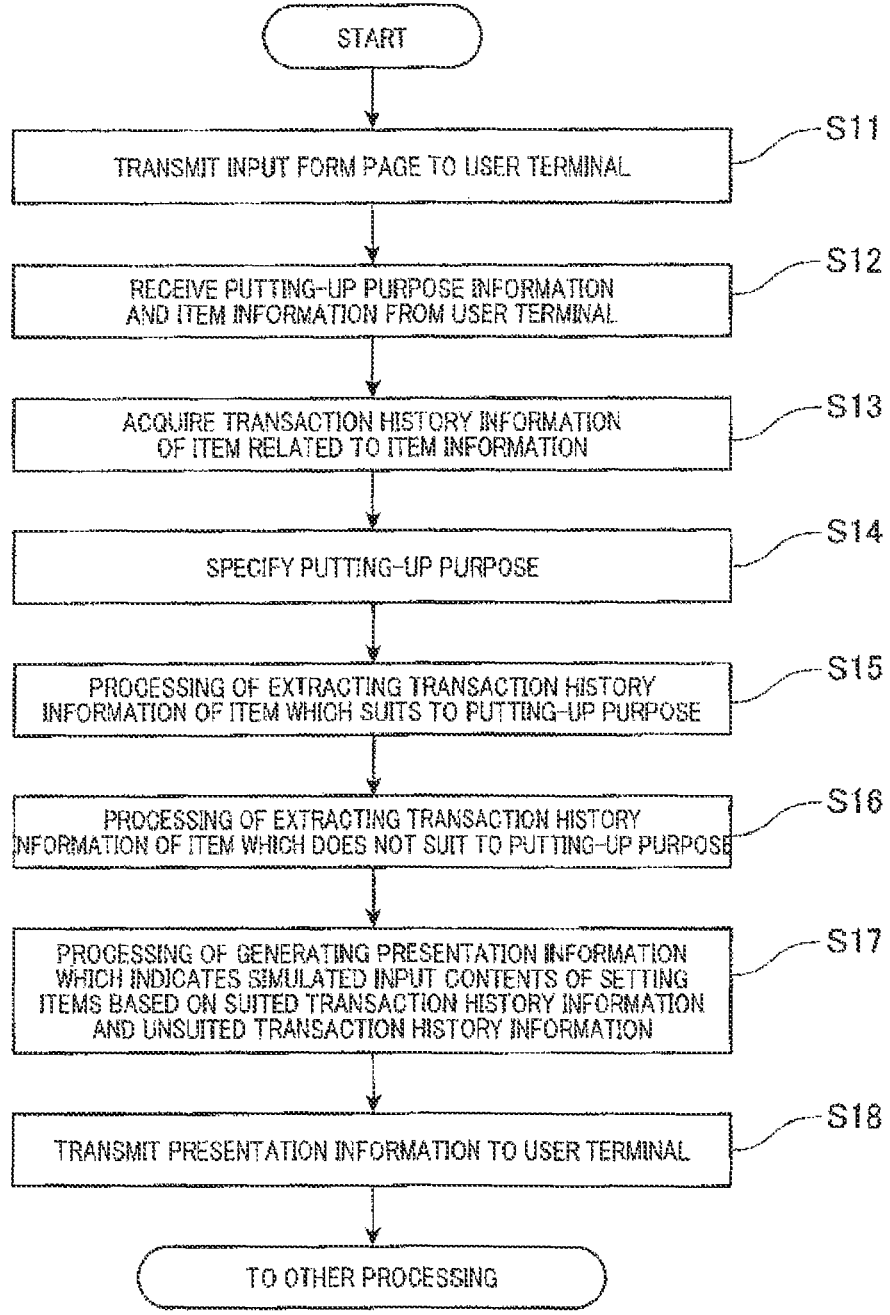

PUTTING-UP PURPOSE [SUCCESSFUL BIDDING PRICE MAXIMIZATION ▽] — 51a

SETTING ITEM

GENRE [WRIST WATCH >> MEN'S WATCH >> ANNA] (GENRE SELECTION)

ITEM NAME [XYZ WATCH]

CONDITIONS OF ITEM ○ NEW ◉ SECONDHAND

DESCRIPTION OF ITEM [         ]

GOOD EXAMPLE ↘

START PRICE [1] YEN    10,000 YEN

BUY-IT-NOW PRICE [10000] YEN    ↖ BAD EXAMPLE

NUMBER OF PUT-UP ITEMS [  ] ITEMS    BAD EXAMPLE

START TIME [2011▽] YEAR [4▽] MONTH [2▽] DAY FROM [5▽] O'CLOCK LEVEL

END TIME [2011▽] YEAR [4▽] MONTH [3▽] DAY BY [22▽] O'CLOCK LEVEL   9 O'CLOCK ON APRIL 4, 2011

CONFIRMATION OF STOCKS ○ YES ◉ NO    BAD EXAMPLE

51b

NUMBER OF TIMES OF AUTOMATIC RE-PUTTING-UP [  ] TIMES   GOOD EXAMPLE

AUTOMATIC EXTENSION ◉ YES  ○ NO    NOT AUTOMATICALLY EXTENDED

DELIVERY METHOD    ANONYMOUS DELIVERY: YOU CAN SHIP ITEM TO SUCCESSFUL BIDDER WITHOUT SHOWING PERSONAL INFORMATION

☑ ABC DELIVERY [UP TO 60 cm ▽]
☐ POSTAL SERVICE [▽ DELIVERY METHOD SELECTION ▽]
☐ T EXPRESS [▽ DELIVERY METHOD SELECTION ▽]

NORMAL DELIVERY: AFTER SUCCESSFUL BIDDER FINISHES PAYMENT, YOU SHOW YOUR PERSONAL INFORMATION AND PERFORM TRANSACTION

GOOD EXAMPLE

☑ ABC DELIVERY [UP TO 60 cm ▽]   PAY SHIPPING FEE ONLY FOR NORMAL DELIVERY
☐ POSTAL SERVICE [▽ DELIVERY METHOD SELECTION ▽]
☐ T EXPRESS [▽ DELIVERY METHOD SELECTION ▽]

FREE SHIPPING

☑ FREE SHIPPING (SELLER PAYS SHIPPING FEE)    BAD EXAMPLE ( CONFIRM ) — 51c

PROCESSING OF AUCTION PROCESSING SERVER ACCORDING TO EMBODIEMNT 3

FIG.10

PUTTING-UP PURPOSE [SUCCESSFUL BIDDING PRICE MAXIMIZATION ▽] ← 51a

SETTING ITEM

- GENRE: [WRIST WATCH >> MEN'S WATCH >> ANNA] (GENRE SELECTION)
- ITEM NAME: [XYZ WATCH]
- CONDITIONS OF ITEM: ○ NEW  ● SECONDHAND
- DESCRIPTION OF ITEM: [WATCH FOR MEN (BLACK) · · · · · · · · · · · ·]
- START PRICE: [1000] YEN
- BUY-IT-NOW PRICE: [10000] YEN — ATTENTION!! START PRICE WOULD BETTER START FROM 1 YEN.
- NUMBER OF PUT-UP ITEMS: [1] ITEMS
- START TIME: [2011▽] YEAR [4▽] MONTH [2▽] DAY FROM [8▽] O'CLOCK LEVEL
- END TIME: [2011▽] YEAR [4▽] MONTH [3▽] DAY BY [21▽] O'CLOCK LEVEL
- CONFIRMATION OF STOCKS: ○ YES  ● NO
- NUMBER OF TIMES OF AUTOMATIC RE-PUTTING-UP: [1] TIMES
- AUTOMATIC EXTENSION: ● YES  ○ NO
- DELIVERY METHOD:
  ANONYMOUS DELIVERY: YOU CAN SHIP ITEM TO SUCCESSFUL BIDDER WITHOUT SHOWING PERSONAL INFORMATION
  ATTENTION!! IT IS ALSO BETTER TO HANDLE ANONYMOUS DELIVERY.
  - ☐ ABC DELIVERY [▽ DELIVERY METHOD SELECTION ▽]
  - ☐ POSTAL SERVICE [▽ DELIVERY METHOD SELECTION ▽]
  - ☐ T EXPRESS [▽ DELIVERY METHOD SELECTION ▽]

NORMAL DELIVERY: AFTER SUCCESSFUL BIDDER FINISHES PAYMENT, YOU SHOW YOUR PERSONAL INFORMATION AND PERFORM TRANSACTION
  - ☑ ABC DELIVERY [UP TO 60 cm ▽]   PAY SHIPPING FEE ONLY FOR NORMAL DELIVERY ← BAD EXAMPLE
  - ☐ POSTAL SERVICE [▽ DELIVERY METHOD SELECTION ▽]
  - ☐ T EXPRESS [▽ DELIVERY METHOD SELECTION ▽]

FREE SHIPPING
  - ☐ FREE SHIPPING (SELLER PAYS SHIPPING FEE)

ATTENTION!! IT IS BETTER TO OFFER FREE SHIPPING.

(CONFIRM) — 51c

AUCTION INFORMATION PROCESSING DEVICE AND AUCTION INFORMATION PROCESSING METHOD

CROSS REFERENCE TO RELATED APPLICATIONS

This application is a National Stage of International Application No. PCT/JP2011/080435 filed Dec. 28, 2011, claiming priority based on Japanese Patent Application No. 2011-100973 filed Apr. 28, 2011, the contents of all of which are incorporated herein by reference in their entirety.

TECHNICAL FIELD

The present invention relates to a technical field of, for example, an information processing device which can help a seller input setting items set to put up an item, to an input form, in an electronic commercial transaction through a network.

BACKGROUND ART

Conventionally, an auction (also referred to as an Internet auction) is known as one of electronic commercial transactions which are conducted through a network. According to this auction, a user who took procedure to use an auction site can access the auction site from a terminal device of the user and put up an item in the auction. A seller needs to input, for example, putting-up conditions which need to be set to various setting items related to putting-up when putting-up an item in the auction. In addition, the setting items include, for example, a putting-up period, a start price, a payment method, a delivery method, item description, an item image and an option setting (an escrow/guaranteed service).

By the way, an operation of inputting matters which need to be set to the setting items is complicated for a seller in some cases. Further, in some cases, the seller does not know how much a start price needs to be set or how long a putting-up period needs to be set to succeed a trade under good conditions. In view of this, according to a technique disclosed in Patent Literature 1, a feature amount of image data of a putting-up request item received from a terminal of a seller is calculated, similarity between the calculated feature amount and a feature amount of image data of each put-up item is calculated and putting-up information is extracted based on this similarity to transmit the putting-up information to the terminal of the seller. According to this technique, it is possible to set putting-up request conditions of a putting-up request item based on putting-up information of a put-up item which is similar to an image of the putting-up request item, open a bidding on the putting-up request item and, as a result, perform a trade under better conditions.

CITATION LIST

Patent Literature

Patent Literature 1: Japanese Patent Application

SUMMARY OF THE INVENTION

Problem to be Solved by the Invention

However, according to the above technique in Patent Literature 1, putting-up information set to an image which is similar to an image of a putting-up request item is only used, and it is difficult to set, for example, adequate putting-up conditions matching a seller's putting-up purpose of an item at the time of putting-up such as "to sell items at higher prices", "to sell out items" or "to have an early bidding".

The present invention is made in light of the above problem, and an object of the present invention is to provide an information processing device, an information processing method, an information processing program, and a recording medium having the information program recorded therein which can present, to a seller, information which enables a setting of, for example, adequate putting-up conditions according to a putting-up purpose of an item.

Means for Solving the Problem

In order to solve the above problem, the invention according to claim 1 is an information processing device which transmits display data of an input form of a setting item set by a seller to put up an item of an electronic commercial transaction target, to a terminal device of the seller, the information processing device comprising:

a receiving means that receives item information of the item to be put up, from the terminal device;

an acquiring means that acquires transaction history information of an item related to the item information received by the receiving means, from a memory means that stores transaction history information of an item put up in past;

a putting-up purpose specifying means that specifies a seller's putting-up purpose of the item;

an extracting means that extracts transaction history information of another item which suits to the putting-up purpose specified by the putting-up purpose specifying means, as suited transaction history information, from the transaction history information acquired by the acquiring means;

a generating means that generates presentation information which indicates a sample of input content of the setting item, based on the suited transaction history information extracted by the extracting means; and a transmitting means that transmits the presentation information generated by the generating means, to the terminal device.

According to the present invention, when the seller puts up the item, presentation information which indicates a sample of input contents of the setting items set for putting-up is generated based on transaction history information of another item which suits to a seller's putting-up purpose of the item, and the presentation information is transmitted to the terminal device of the seller, so that it is possible to effectively present, to the seller, information which enables a setting of, for example, adequate putting-up conditions matching the putting-up purpose of the item.

The invention according to claim 2 is the information processing device according to claim 1, wherein the extracting means further extracts transaction history information of another item which does not suit to the putting-up purpose as unsuited transaction history information;

the information processing device further comprises a first setting item specifying means that specifies the setting item which is a same setting item between the suited transaction history information and the unsuited transaction history information extracted by the extracting means, and to which different content is set;

the generating means generates the presentation information which indicates the sample of input content of the setting item based on content set to the setting item specified by the first setting item specifying means; and the transmitting means transmits the presentation information to the terminal device.

According to the present invention, it is possible to effectively present more precise information matching the putting-up purpose of the item, to the seller.

The invention according to claim 3 is the information processing device according to claim 2, wherein the generating means generates presentation information which indicates content set to the setting item of the suited transaction history information as the sample of input content, and which indicates the sample of input content and content set to the setting content of the unsuited transaction history information in a comparable way; and the transmitting means transmits the presentation information to the terminal device.

According to the present invention, the seller can learn setting items which influence the putting-up purpose at a glance and learn what degree of change of the sample of input content does not suit to the putting-up purpose.

The invention according to claim 4 is the information processing device according to any one of claims 1 to 3, wherein the receiving means receives input information which indicates input content input to at least a part of the setting item by the seller, from the terminal device;

the information processing device further comprises a second setting item specifying means that specifies, from the suited transaction history information, the setting item which is a same setting item between the input information received by the receiving means and the suited transaction history information extracted by the extracting means, and to which different content is set;

the generating means generates the presentation information which indicates the sample of input content of the setting item based on content set to the setting item specified by the second setting item specifying means; and the transmitting means transmits the presentation information to the terminal device.

According to the present invention, it is possible to effectively present, to the seller, input content which does not suit to the putting-up purpose and a model sample of input content among input content input to the setting items by the seller.

The invention according to claim 5 is the information processing device according to claim 4, wherein the extracting means further extracts transaction history information of another item which does not suit to the putting-up purpose as unsuited transaction history information;

the information processing device further comprises a first setting item specifying means that specifies the setting item which is a same setting item between the suited transaction history information and the unsuited transaction history information extracted by the extracting means, and to which different content is set; and the generating means generates presentation information which indicates the sample of input content of the setting item based on content set to the setting item specified by the first setting item specifying means and specified by the second setting item specifying means.

According to the present invention, the seller can learn setting items which influence the putting-up purpose among the input setting items.

The invention according to claim 6 is the information processing device according to claim 4 or 5, wherein the information processing device further comprises a determining means that calculates a difference value which indicates a level of difference between content set to the setting item specified by the second setting item specifying means and the input content input to the same setting item as the setting item, and determines whether or not the calculated difference value is a threshold or more; and when the determining means determines that the difference value is the threshold or more, the generating means generates the presentation information, and the transmitting means transmits the presentation information to the terminal device.

According to the present invention, when a difference between input contents and a sample of input contents is small, it is possible to avoid complication by not presenting the sample of input contents to the seller.

The invention according to claim 7 is the information processing device according to any one of claims 4 to 6, wherein the generating means generates presentation information which indicates the sample of input content, and indicates information which urges the seller to pay attention to an input; and the transmitting means transmits the presentation information to the terminal device.

According to the present invention, it is possible to urge the seller to pay attention upon input.

The invention according to claim 8 is the information processing device according to any one of claims 1 to 7, wherein the extracting means extracts the transaction history information which suits to the putting-up purpose the most, as the suited transaction history information, from a plurality of pieces of the transaction history information acquired by the acquiring means.

According to the present invention, it is possible to effectively present more precise information matching the putting-up purpose of the item, to the seller.

The invention according to claim 9 is the information processing device according to any one of claims 1 to 7, wherein the extracting means extracts a plurality of pieces of the transaction history information which comprises a high degree of suitability to the putting-up purpose and which is a predetermined ranking order or higher, as the suited transaction history information, from the plurality of pieces of the transaction history information acquired by the acquiring means.

According to the present invention, it is possible to effectively present more precise information matching the putting-up purpose of the item, to the seller.

The invention according to claim 10 is the information processing device according to claim 9, wherein the information processing device further comprises a third setting item specifying means that specifies the setting item which is a same setting item between the plurality of the suited transaction history information which is extracted by the extracting means and which is the predetermined ranking order or higher, and to which content which is common at a predetermined rate or more is set;

the generating means generates the presentation information which indicates the sample of input content of the setting item based on content set to the setting item specified by the third setting item specifying means; and the transmitting means transmits the presentation information to the terminal device.

According to the present invention, it is possible to effectively present more precise information matching the putting-up purpose of the item, to the seller.

The invention according to claim 11 is the information processing device according to any one of claims 1 to 10, wherein the extracting means determines which attribute of a business operator or an individual the seller who uses the terminal device comprises, and determines, per transaction history information, which attribute of a business operator or an individual a seller of the item indicated by the transaction history information acquired by the acquiring means comprises, and extracts, as the suited transaction history information, transaction history information of an item put up in past by another seller whose attribute is the same as the attribute of the seller who uses the terminal device, and which suits to the putting-up purpose.

According to the present invention, it is possible to present a more adequate sample of input contents matching the attribute of the seller, to the seller.

The invention according to claim 12 is the information processing device according to any one of claims 1 to 11, wherein the extracting means excludes transaction history information of an item which is set to be displayed in a more distinct mode than other items, from an extraction target.

According to the present invention, it is possible to present a more adequate sample of input contents matching the putting-up mode, to the seller.

The invention according to claim 13 is the information processing device according to any one of claims 1 to 11, wherein the extracting means extracts transaction history information of an item which is set to be displayed in a more distinct mode than other items, as the suited transaction history information, from a plurality of pieces of the transaction history information acquired by the acquiring means.

According to the present invention, it is possible to present a more adequate sample of input contents matching the putting-up mode, to the seller.

The invention according to claim 14 is the information processing device according to any one of claims 1 to 13, wherein the acquiring means acquires transaction history information related to an item which comprises a part or entirety of the item information;

the extracting means extracts a plurality of pieces of the transaction history information which suits to the putting-up purpose, as the suited transaction history information, from a plurality of pieces of the transaction history information acquired by the acquiring means;

the information processing device further comprises a suited transaction history information specifying means that compares a plurality of pieces of the suited transaction history information extracted by the extracting means, and specifies the suited transaction history information which suits to the putting-up purpose the most;

the generating means generates presentation information which indicates a sample of input content of the setting item, based on the suited transaction history information specified by the suited transaction history information specifying means; and the transmitting means transmits the presentation information to the terminal device.

According to the present invention, it is possible to present a more adequate sample of input contents matching the putting-up mode, to the seller.

The invention according to claim 15 is the information processing device according to claims 1 to 14, wherein the receiving means receives putting-up purpose information specified by the seller, from the terminal device; and the putting-up purpose specifying means specifies the putting-up purpose based on the putting-up purpose information received by the receiving means.

According to the present invention, it is possible to reliably specify a putting-up purpose based on the seller.

The invention according to claim 16 is the information processing device according to any one of claims 1 to 14, wherein the putting-up purpose specifying means specifies the putting-up purpose based on attribute information which indicates an attribute of a buyer of an item included in the transaction history information acquired by the acquiring means.

According to the present invention, the seller can skip a labor of thinking and specifying a putting-up purpose.

The invention according to claim 17 is the information processing device according to any one of claims 1 to 14, wherein the receiving means receives input information which indicates input content input to the setting item by the seller, from the terminal device; and the putting-up purpose specifying means specifies the putting-up purpose based on the input information received by the receiving means.

According to the present invention, the seller can skip a labor of thinking and specifying a putting-up purpose.

The invention according to claim 18 is the information processing device according to claim 17, wherein the putting-up purpose specifying means acquires a value which indicates at least one of a price and a putting-up period of an item to be put up, from the input information received by the receiving means, and specifies the putting-up purpose, based on at least one of a relationship as to which one of the acquired value which indicates the price of the item and a first threshold is higher, and a relationship as to which one of the acquired value which indicates the putting-up period and a second threshold is higher.

According to the present invention, the seller can skip a labor of thinking and specifying a putting-up purpose.

The invention according to claim 19 is an information processing method which is executed by a computer which transmits display data of an input form of a setting item set by a seller to put up an item of an electronic commercial transaction target, to a terminal device of the seller, the information processing method comprising:

a step of receiving item information of the item to be put up, from the terminal device;

a step of acquiring transaction history information of an item related to the received item information, from a memory means that stores transaction history information of an item put up in past;

a step of specifying a seller's putting-up purpose of the item;

a step of extracting transaction history information of another item which suits to the specified putting-up purpose, as suited transaction history information, from the acquired transaction history information;

a step of generating presentation information which indicates a sample of input content of the setting item, based on the extracted suited transaction history information; and a step of transmitting the generated presentation information to the terminal device.

The invention according to claim 20 is an information processing program causing a computer which transmits display data of an input form of a setting item set by a seller to put up an item of an electronic commercial transaction target, to a terminal device of the seller, to function as:

a receiving means that receives item information of the item to be put up, from the terminal device;

an acquiring means that acquires transaction history information of an item related to the item information received by the receiving means, from a memory means that stores transaction history information of an item put up in past;

a putting-up purpose specifying means that specifies a seller's putting-up purpose of the item;

an extracting means that extracts transaction history information of another item which suits to the putting-up purpose specified by the putting-up purpose specifying means, as suited transaction history information, from the transaction history information acquired by the acquiring means;

a generating means that generates presentation information which indicates a sample of input content of the setting item, based on the suited transaction history information extracted by the extracting means; and a transmitting means that transmits the presentation information generated by the generating means, to the terminal device.

The invention according to claim 21 is a recording medium having an information processing program recorded therein which causes a computer which transmits display data of an input form of a setting item set by a seller to put up an item of an electronic commercial transaction target, to a terminal device of the seller, to function as:

a receiving means that receives item information of the item to be put up, from the terminal device;

an acquiring means that acquires transaction history information of an item related to the item information received by the receiving means, from a memory means that stores transaction history information of an item put up in past;

a putting-up purpose specifying means that specifies a seller's putting-up purpose of the item;

an extracting means that extracts transaction history information of another item which suits to the putting-up purpose specified by the putting-up purpose specifying means, as suited transaction history information, from the transaction history information acquired by the acquiring means;

a generating means that generates presentation information which indicates a sample of input content of the setting item, based on the suited transaction history information extracted by the extracting means; and a transmitting means that transmits the presentation information generated by the generating means, to the terminal device.

Advantageous Effects of Invention

According to the present invention, when a seller puts up an item, presentation information which indicates a sample of input contents of setting items set for this putting-up is generated based on transaction history information of other items which suit to purposes of seller's putting-up of items, and the presentation information is transmitted to a terminal device of the seller, so that it is possible to effectively present, to a seller, information which enables a setting of, for example, adequate putting-up conditions matching a putting-up purpose of the item.

BRIEF DESCRIPTION OF DRAWINGS

FIG. 2 is a block diagram illustrating an example of a schematic configuration of an auction processing server SA according to the present embodiment.

FIG. 3A to FIG. 3C are views illustrating examples of content registered in various databases.

FIG. 4 is a flowchart illustrating a part of putting-up processing in a system control unit 4 of the auction processing server SA according to Embodiment 1.

FIG. 5 is a view illustrating a display Example of an input form page.

FIG. 6 is a view illustrating a display Example of an input form page which displays a sample of input contents according to Embodiment 1.

FIG. 7 is a flowchart illustrating a part of putting-up processing in a system control unit 4 of an auction processing server SA according to Example 2.

FIG. 8 is a view illustrating a display example of an input form page which displays a sample of input contents and a non-sample of input contents in a comparable way according to Embodiment 2.

FIG. 10 is a view illustrating a display Example of an input form page which displays a sample of input content and attention messages according to Embodiment 3.

MODE FOR EMBODYING THE INVENTION

An embodiment of the present invention will be described below with reference to the drawings. In addition, the embodiment will be described where the present invention is applied to an auction processing system.

[1. Outline of Configuration and Function of Auction Processing System]

First, an outline of a configuration and a function of an auction processing system S according to one embodiment of the present invention will be described using FIG. 1.

Figure 1:
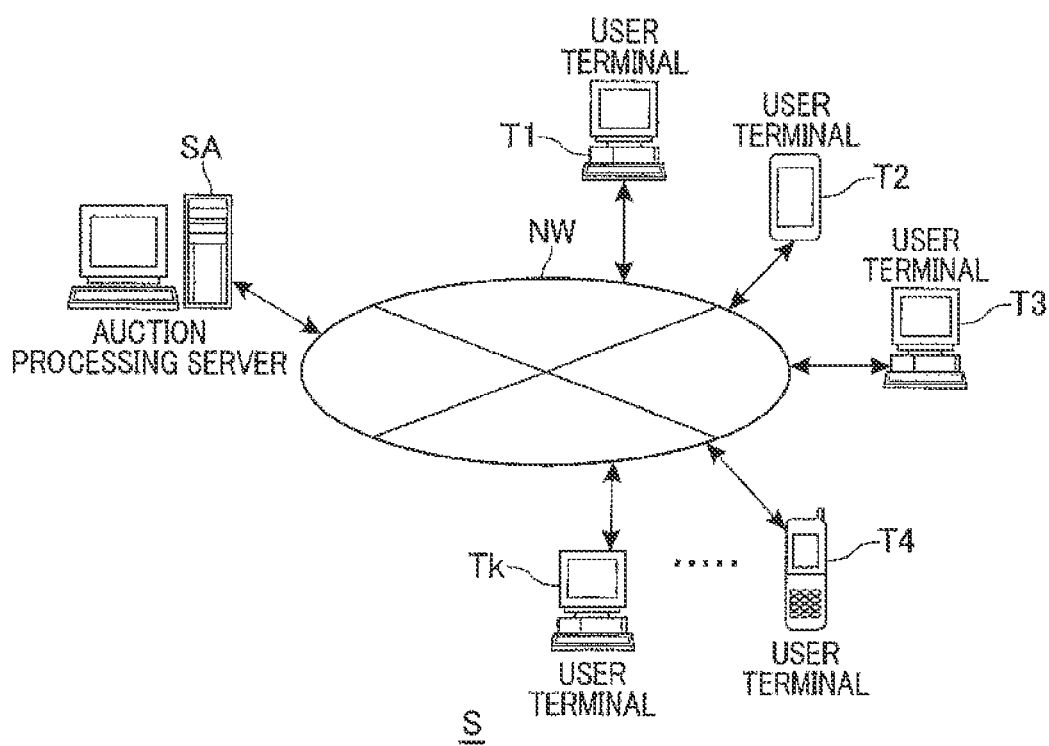
FIG. 1 is a view illustrating an example of a schematic configuration of an auction processing system S according to the present embodiment.

FIG. 1 is a view illustrating an Example of a schematic configuration of the auction processing system S according to the present embodiment.

As illustrated in FIG. 1, the auction processing system S has a plurality of user terminals (an example of a terminal device) Tn (n=1, 2, 3, . . . and k) and an auction processing server (an example of an information processing device) SA. The user terminals Tn and the auction processing server SA are connected to a network NW. In addition, the network NW is constructed with, for example, the Internet, dedicated communication lines (for example, CATV (Community Antenna Television) lines), a mobile communication network (including, for example, base stations) and a gate way.

Further, the user terminal Tn is, for example, a personal computer (PC), a PDA (Personal Digital Assistant), a mobile telephone or a smartphone, and has a web browser function. The user terminal Tn accesses the auction processing server SA and acquires webpages through the web browser, and displays the webpages on a display.

The auction processing server SA is a server (for example, a web server and a database server) installed to operate an auction site.

FIG. 2 is a block diagram illustrating an example of a schematic configuration of the auction processing server SA according to the present embodiment.

As illustrated in FIG. 2, the auction processing server SA has a communication unit 1, a memory unit 2 (an example of a memory means), an input/output interface unit 3 and a system control unit 4. Further, the system control unit 4 and the input/output interface unit 3 are connected through a system bus 5.

The communication unit 1 connects to the network NW, and controls communication states with the user terminals Tn.

The memory unit 2 is formed by, for example, a hard disk drive, and stores various programs such as an operating system and an auction processing program (including the information processing program according to the present invention). In addition, the auction processing program may be acquired (downloaded) from, for example, a predetermined server through the network NW, or may be recorded in and read from a recording medium such as a CD (Compact Disc) and a DVD (Digital Versatile Disc).

Further, in the memory unit 2, a structured document (for example, HTML (Hyper Text Markup Language) document or XHTML document) file (an example of display data), and an image file to be displayed on the user terminal Tn are stored. Webpages include a page (referred to as an "input form page" below) which displays a screen of an input form of various setting items such as putting-up conditions set by a seller for putting-up in an auction, and a page which displays a screen for browsing put-up items. In addition, an input form page may be configured by one page or may be configured by a plurality of pages.

Further, in the memory unit 2, a user information database (DB) 21, an auction database (DB) 22, and a successful bidding market price database (DB) 23 are formed.

FIG. 3A to FIG. 3C are views illustrating examples of contents (items) registered in various databases.

In the user information database 21 illustrated in FIG. 3A, user information such as a user ID, a log-in ID, a password, a nickname, a name, the gender, the age, a hobby, an address, a telephone number, and a mail address of a user (a user who becomes a seller, a bidder or a successful bidder of the auction) registered as a member of the auction is associated per use and registered (stored). In addition, the user ID is identification information for identifying a user as a member. The log-in ID and the password are authentication information used for log-in processing (user authentication processing) of participating the auction (putting-up an item or making a bid).

In the auction database 22 illustrated in FIG. 3B, an auction ID, putting-up information, bidding information and successful bidding information are associated per auction and registered. However, bidding information of an item which is not yet bid and successful bidding information of an item which is not successfully bid are not registered. The auction ID is identification information for identifying an auction of a given item.

The putting-up information includes a user ID of a seller and contents set to various setting items such as putting-up conditions. The setting items include, for example, an item name (a name of an item: an example of item information), a genre of an item (also referred to as a "category"), an item number of an item (an example of item information), conditions of an item, description of an item, a form of an item, a start price (a price upon start of putting-up), a buy it now price, confirmation of stocks, a reserve price, the number of put-up items, a start time (a putting-up start date), an end time (a putting-up end date), an early end, an item image, availability of refund, bidder evaluation restriction, the number of times of automatic re-putting-up, automatic extension of an end time, a dispatch area, a delivery method, a payment method (method of payment), escrow/guarantee, a hot auction setting and a put-up item advertisement setting.

Meanwhile, the item number of an item is, for example, a number written below a bar-code assigned to the item. An item can be specified based on this item number. In addition, the item number may be any information as long as the item number is information based on which an item can be specified, and may be, for example, an item code such as a JAN code. The form of the item indicates, for example, whether a put-up item is near mint-condition, a limited item, not for sale, an accessory or all volumes (in case of books). The conditions of the item indicate whether a put-up item is new or secondhand. The buy it now price indicates a price at which bidding is successfully closed on a first-bid-first-served basis by making a bid. Confirmation of stocks indicates that cancellation is acceptable when there is no stock after successful bidding, and setting content thereof is yes or no. The early end indicates that an auction of a put-up item ends earlier than an end time, and setting content thereof is yes or no. Bidder evaluation restriction indicates that bidding by a user whose evaluation is a predetermined value or less is restricted, and setting content thereof is yes or no. The hot auction setting is an example of a setting which displays a put-up item in a more distinct mode than other items, and setting content thereof is yes or no. For example, item information of an item which is put-up and to which a hot auction setting is applied is displayed in a "hot auction" field at an upper portion of a put-up item list page (displayed at a position different from an item to which a hot auction setting is not set). In addition, a setting of displaying a put-up item in a more distinct mode than the other items includes a hot auction setting and, for example, a setting of highlighting item information of the put-up item. Highlighting item information includes, for example, increasing sizes of letters, changing letters or a background to vivid colors or displaying a predetermined image or a mark. Further, the put-up item advertisement setting is a setting of put-up item information of a put-up item on a webpage other than a put-up item list page, and setting content thereof is yes or no. This put-up item advertisement setting is also an example of a setting of displaying a put-up item in a more distinct mode than the other items.

Further, contents set to setting items are input by a seller through a screen of an input form displayed on the display of the user terminal Tn. Meanwhile, "input" includes that the seller inputs letters using the operating unit (for example, a keyboard, a mouse or a touch panel) of the operating unit of the user terminal Tn or the seller selects (designates) a desired input candidate from a plurality of input candidates (for example, a list which displays input candidates) prepared for one setting item using the operating unit. In addition, above "letter input" may be performed by recognizing speech uttered by the seller by a speech recognition function of the user terminal Tn and converting the speech into the letters. Further, above "selection of input candidates" also includes adopting a candidate which is input and displayed as default without selecting candidates. Input contents input in this way are registered in the auction database 22 as putting-up information, so that setting each setting item is finished. In addition, setting items other than, for example, an item name (or an item code), a start price, an end time, the number of put-up items, a delivery method and a payment method among the setting items are not set in some cases.

The bidding information includes, for example, a user ID of a bidder, a bidding price, the number of bid items and a bidding date. The successful bidding information includes, for example, a user ID of a successful bidder, a successful bidding price, the number of successfully bid items, a market price upon successful bidding and a successful bidding date.

As described above, putting-up information, bidding information and successful bidding information registered in the auction database 22 configure transaction history information of items put up in the past. In addition, the auction database 22 may be provided in a memory means of a predetermined server which the auction processing server SA can access. Further, a configuration may be employed where a database in which transaction history information extracted from the auction database 22 is registered is provided separately from the auction database 22.

In the successful bidding market price database 23, an item name of an item, a genre of an item, an item number of an item and a successful bidding market price are associated per item and registered. The successful bidding market price is a market price which is an indication as to at what price an item is sold when the item is put up. Such a successful bidding price is provided in response to a request from the user terminal Tn. In addition, a method of calculating a successful bidding market price is known and therefore will not be described in detail.

The input/output interface unit 3 performs interface processing between the communication unit 1 and the memory unit 2, and the system control unit 4.

The system control unit 4 includes, for example, a CPU (Central Processing Unit) 4a, a ROM (Read Only Memory) 4b and a RAM (Random Access Memory) 4c. Further, the system control unit 4 which serves as a computer executes putting-up processing, bidding processing and successful bidding processing in the auction according to the auction processing program stored in the memory unit 2. In the present embodiment in particular, upon the putting-up processing in the auction, the system control unit 4 functions as, for example, a receiving means, an acquiring means, a putting-up purpose specifying means, an extracting means, a first setting item specifying means, a second setting item specifying means, a third setting item specifying means, a suited transaction history information specifying means, a determining means, a generating means and a transmitting means according to the present invention, according to the information processing program according to the present invention (that is, the information processing program according to the present invention causes the system control unit 4 to execute the above means). By this means, a sample of input contents of the above setting items are presented to the seller such that, based on transaction history information (transaction history information of items put up in the past) of other items which suit to a seller's putting-up purpose of an item, the seller can set, for example, adequate putting-up conditions matching the putting-up purpose.

[2. Processing of Putting-Up in Auction]

Next, Embodiment 1 to Embodiment 7 of putting-up processing in an auction according to the present embodiment will be separately described.

Embodiment 1

First, putting-up processing in an auction according to Embodiment 1 will be described using, for example, FIG. 4. This Embodiment 1 is an Example where presentation information is generated using transaction history information of an item which suits to a putting-up purpose. FIG. 4 is a flowchart illustrating part of putting-up processing in a system control unit 4 of an auction processing server SA according to Embodiment 1.

The system control unit 4 of the auction processing server SA starts processing illustrated in FIG. 4 in response to a request of an input form page from a user the user terminal T1 after log-in processing of a user of the user terminal T1 which makes an access through the network NW, and transmits a structured document file of the input form page to the user terminal T1 through a network NW (step S1). Thus, the user terminal T1 displays the input form page on the display by means of a web browser.

FIG. 5 is a view illustrating a display example of an input form page. An input form page 51 illustrated in FIG. 5 includes a putting-up purpose input portion 51a and a setting item input portion 51b. In the putting-up purpose input portion 51a, putting-up purpose candidates prepared in advance are displayed by way of pull-down in a selectable way. The seller can input a putting-up purpose by selecting (designating) a desirable putting-up purpose from the putting-up purpose candidates. In an example illustrated in FIG. 5, "successful bidding price maximization", "early bidding" and "sellout" are displayed as putting-up purpose candidates. The purpose of "successful bidding price maximization" is to sell an item at as much a high price as possible. The purpose of "early bidding" is that a bidding is made as early as possible. The purpose of "sellout" is to sell an item without a fail. In addition, in addition to these purposes, the putting-up purposes include "to sell items for high school students", "to sell items for old people", "to sell items for high school girls" and "to sell items for old men".

Meanwhile, in the setting item input portion 51b, the seller inputs various setting items such as a genre of an item, an item name, conditions of an item, description of an item, a start price, a buy it now price, the number of put-up items, a start time, an end time, confirmation of stocks, the number of times of automatic re-putting-up, automatic extension and a delivery method (inputs in an entry field (or a selection field) matching each setting item). In addition, the genre of an item is input on a page displayed immediately before the input form page 51. Further, when the seller inputs the putting-up purpose in the putting-up purpose input portion 51a and inputs an item name using the operating unit, the user terminal T1 transmits putting-up purpose information which indicates the input putting-up purpose and item information which indicates the input genre and item name, to the auction processing server SA through the network NW. Meanwhile, putting-up purpose information and item information are transmitted when the seller designates a transmission button (not illustrated) provided in the input form page 51. In addition, when an item number of an item can be obtained, an item number of an item code may be input instead of an item name.

Thus, when receiving putting-up purpose information and item information from the user terminal T1 (step S2), the system control unit 4 of the auction processing server SA acquires transaction history information of an item related to the received information, from the auction database 22 (step S3). Meanwhile, "an item related to item information" corresponds to, for example, an item, entirety or part of which match with the item name (or the item name or the genre) included in item information. In addition, the phrase "part of which match with the item name" means that a match with 90% or more of the entirety of the item name is found.

Next, the system control unit 4 specifies the putting-up purpose based on putting-up purpose information received in above step S2 (step S4). That is, in this case, the user terminal T1 specifies a putting-up purpose explicitly designated by the seller.

Next, the system control unit 4 performs processing of extracting transaction history information of an item which suits to the putting-up purpose specified in above step S4 (step S5). According to this extraction processing, for example, transaction history information which suits to the putting-up purpose the most or a plurality of pieces of transaction history information which includes a high degree of suitability to the putting-up purpose and which is at a predetermined ranking order or more (for example, transaction history information of the first place (the highest) to the fifth place among a plurality of pieces of transaction history information sorted in order of a higher degree of suitability) is extracted from the transaction history information acquired in above step S3 as suited transaction history information. Hereinafter, extraction processing matching each putting-up purpose will be described below.

(i) A putting-up purpose is "successful bidding price maximization"

In this case, as suited transaction history information which suits to the putting-up purpose the most, for example, transaction history information of an item which has the highest successful bidding price included in the transaction history information is extracted. Alternatively, as suited transaction history information which has a high degree of suitability to the putting-up purpose and which is at a predetermined ranking order or more, transaction history information of an item which has a high successful bidding price included in the transaction history information and which is at a predetermined ranking order (for example, the fifth place) or more is extracted.

(ii) A putting-up purpose is "early bidding"

In this case, as suited transaction history information which suits to the putting-up purpose the most, for example, transaction history information of an item which has the shortest time which is included in the transaction history information and which is from a putting-up start date to the first bidding date is extracted. Alternatively, as suited transaction history information which has a high degree of suitability to the putting-up purpose and which is at a predetermined ranking order or more, transaction history information of an item which has a short time which is included in the transaction history information and which is from the putting-up start date to the first bidding date, and which is at a predetermined ranking order (for example, the fifth place) or more is extracted.

(iii) A putting-up purpose is "sellout"

In this case, as suited transaction history information which suits to the putting-up purpose the most, for example, transaction history information of an item which has the lowest start price among items which have start prices which are included in the transaction history information and which are lower than a market price is extracted. Alternatively, as suited transaction history information which has a high degree of suitability to the putting-up purpose and which is at a predetermined ranking order or more, transaction history information of an item which has a low start price among items which have start prices which are included in the transaction history information and which are lower than the market price is extracted, and which is at a predetermined ranking order (for example, the fifth place) or more. Meanwhile, the market price is acquired from the successful bidding market price database 23.

In addition, when the putting-up purpose is to "sell items for high school girls", (for example, a predetermined number of pieces of) transaction history information of items which are successfully bid by female successful bidders included in an age group of 15 years old to 18 years old is extracted as suited transaction history information which suits to the putting-up purpose. Further, when the putting-up purpose is to "sell items for old men", (for example, a predetermined number of pieces of) transaction history information of items which are successfully bid by, for example, male successful bidders whose age is 60 years old or more is extracted as suited transaction history information which suits to the putting-up purpose.

Next, the system control unit 4 performs processing of generating presentation information which indicates a sample of input contents of predetermined setting items based on the suited transaction history information extracted in above step S5 (step S6). According to this generation processing, the system control unit 4 first extracts, as a sample of input contents, contents set to, for example, a start price, a buy it now price, a start time, an end time, a delivery method and an item image as predetermined setting items of the above suited transaction history information. Meanwhile, the contents set to the setting items and a sample of input contents do not necessarily need to match, and the entirety or part of the above set content only needs to be included in the sample of input contents (the same applies below). Further, when a setting item is an item image, whether or not the item image is set: yes or no is extracted as a sample of input content instead of image data. Furthermore, when the setting item is a start time or an end time, for example, the time (a year, a month and a date are past and therefore excluded) is extracted (a day of a week may be extracted). Still further, which content set to which setting item is extracted as a sample of input content is determined in advance by taking into account, for example, the degree of influence (the level of influence) of a setting item on the putting-up purpose. A configuration may be employed where the setting items determined in this way are different between putting-up purposes (for example, between "successful bidding price maximization" and "early bidding"). This is because the degree of influence of the setting item on the putting-up purpose differs per putting-up purpose.

By the way, in case of a configuration of, in above step S5, extracting suited transaction history information which suits to the putting-up purpose the most, the system control unit 4 extracts content which is set to a predetermined setting item in the above suited transaction history information as a sample of input content.

Meanwhile, in case of a configuration of, in above step S5, extracting a plurality of pieces of suited transaction history information which has a high degree of suitability to the putting-up purpose and is at a predetermined ranking order or more, the system control unit 4 specifies a setting item which is the same setting item (for example, the start price) between a plurality of pieces of suited transaction history information and to which content which is common at a predetermined rate or more, and extracts content set to the specified setting item as a sample of input content. Meanwhile, "a setting item to which content which is common at a predetermined rate or more is set" means that, when, for example, there are five pieces of suited transaction history information, content of a setting item is common at a predetermined rate (for example, ⅗) or more (in other words, three or more) among the five pieces of suited transaction history information. When common content is classified into a plurality of contents, the number of which is greater (majority) only needs to be extracted as a sample of input content. When, for example, "1 yen" is set to start prices indicated by three pieces of suited transaction history information of the extracted five pieces of suited transaction history information, and "100 yen" is set to start prices indicated in the other two prices of suited transaction history information, "1 yen" which is content set to the start prices indicated in the three suited transaction history information is extracted as sample of input content.

Meanwhile, when common content is classified into a plurality of contents, and the numbers are the same (for example, "1 yen" is set to start prices indicated in the two pieces of suited transaction history information and "100 yen" is set to start prices indicated in the other two suited transaction history information), for example, one of contents selected at random (alternatively, both contents) only needs to be extracted as a sample of input content.

Meanwhile, when there is no common content (when, for example, content set to each start price indicated in the five pieces of suited transaction history information is different), for example, one of contents (alternatively, a plurality of contents) selected at random only needs to be extracted as sample of input content. Alternatively, a configuration may be employed where, when there is no common content, no content is extracted as sample of input content. In this case, a sample of input content of a target setting item is not displayed.

In addition, when a plurality of setting items is specified, the above content is extracted per specified setting item.

In addition, even when, for example, five pieces of suited transaction history information which suits to a putting-up purpose such as "to sell items for high school students" or "to sell items for older people" are extracted in above step S5, a sample of input content is extracted according to the same method as that of the configuration of extracting a plurality of pieces of suited transaction history information which includes a high degree of suitability to the putting-up purpose and which is at a predetermined ranking order or more. Further, when, for example, the putting-up purpose is to "sell items for high school girls", content (for example, a unique character string such as fonts or emoticons) set to the setting item of "description of an item" in suited transaction history information which suits to this putting-up purpose is extracted as sample of input content in some cases.

When a sample of input contents of predetermined setting items are extracted as described above, the system control unit 4 then generates presentation information which indicates the sample of input content extracted per predetermined setting item according to the above generation processing. This presentation information is, for example, data which displays the above sample of input contents in entry fields matching the setting items provided in the setting item input portion 51*b* of the input form page 51 or in the vicinities of the entry fields.

Further, the system control unit 4 transmits the presentation information generated in above step S6 to the user terminal T1 through the network NW (step S7).

Thus, when receiving presentation information, the user terminal T1 embeds this presentation information in structured document of the input form page 51, and displays the above sample of input contents in the entry fields (or selection fields) matching setting items indicated in the presentation information or in the vicinities of the entry fields (or selection fields). FIG. 6 is a view illustrating a display example of an input form page which displays a sample of input contents according to Example 1. In the example illustrated in FIG. 6, the putting-up purpose is "successful bidding price maximization", and a sample of input contents are displayed in entry fields matching the start price, the buy it nor price, the start time, the end time, confirmation of stocks, automatic extension and the delivery method. In this case, "1 yen" is presented as a sample of input content of the start price, and "10,000 yen" is presented as a buy it now price. In addition, a configuration may be employed where the price of the buy it now price matching the current market price is presented by being multiplied with a ratio of a market price upon successful bidding and a current market price. Further, "9 o'clock on Apr. 2, 2011", that is, 9 o'clock (in the morning) on Saturday, is presented as a sample of input content of the start time, and "22 o'clock on Apr. 3, 2011", that is, 22 o'clock on Sunday, is presented as a sample of input content of the end time. Furthermore, "no" is presented as sample of input content of confirmation of stocks, and "yes" is presented as a sample of input content of automatic extension. Still further, "anonymous delivery" and "normal delivery", and, in addition, "free shipping" are presented as a sample of input contents of a delivery method. In addition, although not illustrated, when a selection field matching a setting item indicated in presentation information is a radio button, display of a sample of input content is selection display of a radio button (for example, black circle is displayed in a round hole). Further, a configuration may be employed where a sample of input content is displayed when, for example, a mouse is placed over a corresponding entry field or the position in the vicinity of the entry field.

Furthermore, the seller confirms a sample of input contents displayed in the entry fields (or the selection fields) as illustrated in FIG. 6, and changes a sample of input contents where necessary. In addition, when a sample of input contents are displayed in the vicinities of the entry fields, the seller may copy the sample of input contents using the operating unit and paste the sample of input contents in the entry fields. Then, the seller proceeds to the next step and performs an operation of finally determining putting-up of an item to set input content input to each entry field to each setting item (that is, registered as putting-up information in the auction database 22).

As described above, according to Embodiment 1, when a seller puts up an item, presentation information which indicates a sample of input contents of setting items set for this putting-up is generated based on transaction history information of other items which suit to seller's putting-up purposes of an item, and the presentation information is transmitted to the terminal device T1 of the seller, so that it is possible to effectively present, to a seller, information (model information) which enables a setting of, for example, adequate putting-up conditions matching a putting-up purpose of the item.

In addition, when a predetermined setting item in the suited transaction history information is description of an item, if an item (an item which has variations of a plurality of colors) is described in content set to this setting item, it is possible to present the sample of input content which indicates a color of the item to the seller. By this means, when, for example, the color of an item to be put up differs from the color of the item indicated by sample of input content, and there is an item of a color indicated by the sample of input content, it is also possible to make a change to put up the item of this color.

Embodiment 2

Next, putting-up processing in an auction according to Embodiment 2 will be described using, for example, FIG. 7. This Embodiment 2 is an example where presentation information is generated using transaction history information of an item which suits to a putting-up purpose and, in addition, transaction history information of an item which does not suit to a putting-up purpose. FIG. 7 is a flowchart illustrating part of putting-up processing in a system control unit 4 of an auction processing server SA according to Embodiment 2. In addition, processing in step S11 to step S15 is the same as processing in step S1 to step S5 illustrated in FIG. 4, and therefore will not be described.

In step S16 illustrated in FIG. 7, the system control unit 4 of the auction processing server SA performs processing of extracting transaction history information of an item which does not suit to a putting-up purpose specified in above step S14. According to this extraction processing, for example, transaction history information which does not suit to the putting-up purpose the most or a plurality of pieces of transaction history information which includes a low degree of suitability to the putting-up purpose and which is at a predetermined ranking order or more (for example, transaction history information of the first place (the lowest) to the fifth place among a plurality of pieces of transaction history information sorted in order of a lower degree of suitability) is further extracted from the transaction history information acquired in above step S13 as unsuited transaction history information.

When, for example, the putting-up purpose is "successful bidding price maximization", as unsuited (non-suited) transaction history information which does not suit to the putting-up purpose the most, for example, transaction history information of an item which has the lowest successful bidding price included in the transaction history information is extracted. Alternatively, as unsuited transaction history information which has a low degree of suitability to the putting-up purpose and which is at a predetermined ranking order or more, transaction history information of an item which has a low successful bidding price included in the transaction history information and which is at a predetermined ranking order (for example, the fifth place) or more is extracted. This unsuited transaction history information can be referred to as transaction history information when an item is sold cheaper more than the seller assumed.

Meanwhile, when the putting-up purpose is "early bidding", as unsuited transaction history information which does not suit to the putting-up purpose the most, for example, transaction history information of an item which has the longest time which is included in the transaction history information and which is from a putting-up start date to the first bidding date is extracted. Alternatively, as unsuited transaction history information which has a low degree of suitability to the putting-up purpose and which is at a predetermined ranking order or more, transaction history information of an item which has a long time which is included in the transaction history information and which is from the putting-up start date to the first bidding date, and which is at a predetermined ranking order (for example, the fifth place) or more is extracted.

Meanwhile, when the putting-up purpose is "sellout", as unsuited transaction history information which does not suit to the putting-up purpose the most, for example, transaction history information of an item which has the highest start price time among items which have start prices which are included in transaction history information and which are higher than a market price is extracted. Alternatively, as unsuited transaction history information which has a low degree of suitability to the putting-up purpose and which is at a predetermined ranking order or more, transaction history information of an item which has a high start price among items which have start prices which are included in the transaction history information and which are higher than the market price is extracted, and which is at a predetermined ranking order (for example, the fifth place) or more.

Next, the system control unit 4 performs processing of generating presentation information which indicates a sample of input contents of predetermined setting items based on the suited transaction history information extracted in above step S15 and the unsuited transaction history information extracted in above step S16 (step S17). According to, for example, this generation processing, the system control unit 4 first extracts, as a sample of input contents, contents set to, for example, a start price, a buy it now price, a start time, an end time, a delivery method and an item image as predetermined setting items of the above suited transaction history information. Next, the system control unit 4 extracts, as a non-sample of input contents, contents set to, for example, a start price, a buy it now price, a start time, an end time, a delivery method and an item image as predetermined setting items in the above unsuited transaction history information. Meanwhile, the contents set to the setting items and the non-sample of input contents do not necessarily need to match, and the entirety or part of the set contents only need to be included in the non-sample of input contents (the same applies below).

By the way, in case of a configuration of, in above step S16, extracting unsuited transaction history information which does not suit to the putting-up purpose the most, the system control unit 4 extracts contents set to predetermined setting items in the unsuited transaction history information as a non-sample of input contents. In addition, in case of a configuration of, in above step S15, extracting suited transaction history information which suits to the putting-up purpose the most, a sample of input contents are extracted according to the same method as that in Embodiment 1.

Meanwhile, in case of a configuration of, in above step S16, extracting a plurality of pieces of unsuited transaction history information which includes a low degree of suitability to the putting-up purpose and which is at a predetermined ranking order or more, the system control unit 4 specifies a setting item which is the same setting item between a plurality of pieces of suited transaction history information and to which content which is common at a predetermined rate or more is set, and extracts the content set to the specified setting item as a non-sample of input content. Meanwhile, when common content is classified into a plurality of contents, the number of which is greater only needs to be extracted as a non-sample of input content. Meanwhile, when common content is classified into a plurality of contents, and the numbers are the same, one of contents selected at random (or both contents) only need to be extracted as a non-sample of input contents. Further, when there is no common content, for example, one of contents selected at random (or a plurality of contents) only need to be extracted as a non-sample of input content. In addition, when a plurality of setting items is specified, the above content is extracted per specified setting item. In addition, in case of a configuration of, in above step S15, extracting a plurality of pieces of suited transaction history information which includes a high degree of suitability to the putting-up purpose and which is a predetermined ranking order or more, a sample of input contents are extracted according to the same method as that in Embodiment 1.

When a sample of input contents and a non-sample of input contents of predetermined setting items are extracted as described above, according to the generation processing, the system control unit 4 then specifies a setting item which is the same setting item between the suited transaction history information and the unsuited transaction history information and to which different content is set (that is, a setting item which differs between the sample of input content and the non-sample of input content), and generates presentation information indicating a sample of input content of the setting item based on the content set to the specified setting item. Meanwhile, a setting item (for example, the start price) to which content which differs between suited transaction history information and unsuited transaction history information (for example, a sample of input content is "1 yen" and a non-sample of input content" is "1000 yen") is set can be referred to as a setting item which influences the putting-up purpose, and, therefore, presentation information which indicates a sample of input content of the setting item is generated based on the content set to this setting item.

For example, the system control unit 4 generates presentation information which indicates a sample of input content of the specified setting item and a non-sample of input content of the specified setting item in a comparable way. This presentation information is, for example, data which displays the sample of input contents and the non-sample of input contents in entry fields matching the setting items provided in the setting item input portion 51b of the input form page 51 or in the vicinities of the entry fields. Alternatively, a configuration may be employed where the system control unit 4 generates presentation information which highlights a sample of input content of the specified setting item (in this case, a non-sample of input content is not displayed). This presentation information is, for example, data which highlights the sample of input contents (for example, emphasize a size or a color of letters indicating the sample of input content compared to other letters to display, or emphasize a color or a pattern of a background of letters indicating the sample of input content compared to the other letters to display) in entry fields matching the setting items provided in the setting item input portion 51b of the input form page 51 or in the vicinities of the entry fields. For example, a configuration may be employed where the system control unit 4 generates presentation information which indicates a sample of input content of the specified setting item and non-sample of input content of the specified setting item in a comparable way, and which highlights the sample of input content.

In addition, a configuration may be employed where the presentation information includes a sample of input content of a setting item (for example, a start time) to which the same content between suited transaction history information and unsuited transaction history information (for example, a sample of input content and a non-sample of input content are both "10 o'clock") is set.

Further, the system control unit 4 transmits the presentation information generated in above step S17 to the user terminal T1 through the network NW (step S18).

Thus, when receiving presentation information, the user terminal T1 embeds this presentation information in structured document of the input form page 51, and displays the above sample of input contents in the entry fields (or selection fields) matching setting items indicated in the presentation information or in the vicinities of the entry fields (or selection fields). FIG. 8 is a view illustrating a display example of an input form page which displays a sample of input contents and a non-sample of input contents in a comparable way according to Embodiment 2. In an example illustrated in FIG. 8, a sample of input contents are highlighted as good examples in entry fields matching a start price, an end time, automatic extension and a delivery method, and a non-sample of input contents are displayed as bad examples in the vicinities of the sample of input contents. In this case, "10,000 yen" is presented as non-sample of input content of the start price, "9 o'clock on Apr. 4, 2011", that is, 9 o'clock (in the morning) on a weekday is presented as a non-sample of input content of the end time, "no" is presented as non-sample of input content of automatic extension and "only normal delivery" and "additional fee for shipping" are presented as a non-sample of input contents of the delivery method. Further, in the example illustrated in FIG. 8, a sample of input contents are displayed in entry fields matching the buy it now price and the start time the sample of input contents and a non-sample of input content of which are the same.

In addition, a configuration may be employed where a sample of input content and non-sample of input content are displayed when, for example, a mouse is placed over entry fields matching these contents or the position in the vicinity of the entry field.

Further, the seller confirms a sample of input contents displayed in the entry fields (or the selection fields) as illustrated in FIG. 8 and a non-sample of input contents displayed in the vicinities thereof, and changes a sample of input contents where necessary. Then, the seller proceeds to the next step and performs an operation of finally determining putting-up of an item to set input content input to each entry field to each setting item.

As described above, according to Embodiment 2, when a seller puts up an item, presentation information which indicates a sample of input contents of setting items set upon this putting-up is generated based on transaction history information of other items which suit to seller's putting-up purposes of items and, in addition, unsuited transaction history information which indicates transaction history information of other items which do not suit to the putting-up purpose is generated, and the presentation information is transmitted to the terminal device T1 of the seller, so that it is possible to effectively present more precise information matching a putting-up purpose of the item to a seller.

Further, according to a configuration of highlighting a sample of input content of a setting item which is the same between the suited transaction history information and the unsuited transaction history information and to which different content is set to present to the seller, the seller can learn at a glance a setting item which influences a putting-up purpose.

Furthermore, according to a configuration of presenting the sample of input contents and the non-sample of input contents to the seller in a comparable way, the seller can learn setting items which influence the putting-up purpose at a glance and learn what degree of change of the sample of input content does not suit to the putting-up purpose.

Embodiment 3

Figure 9:
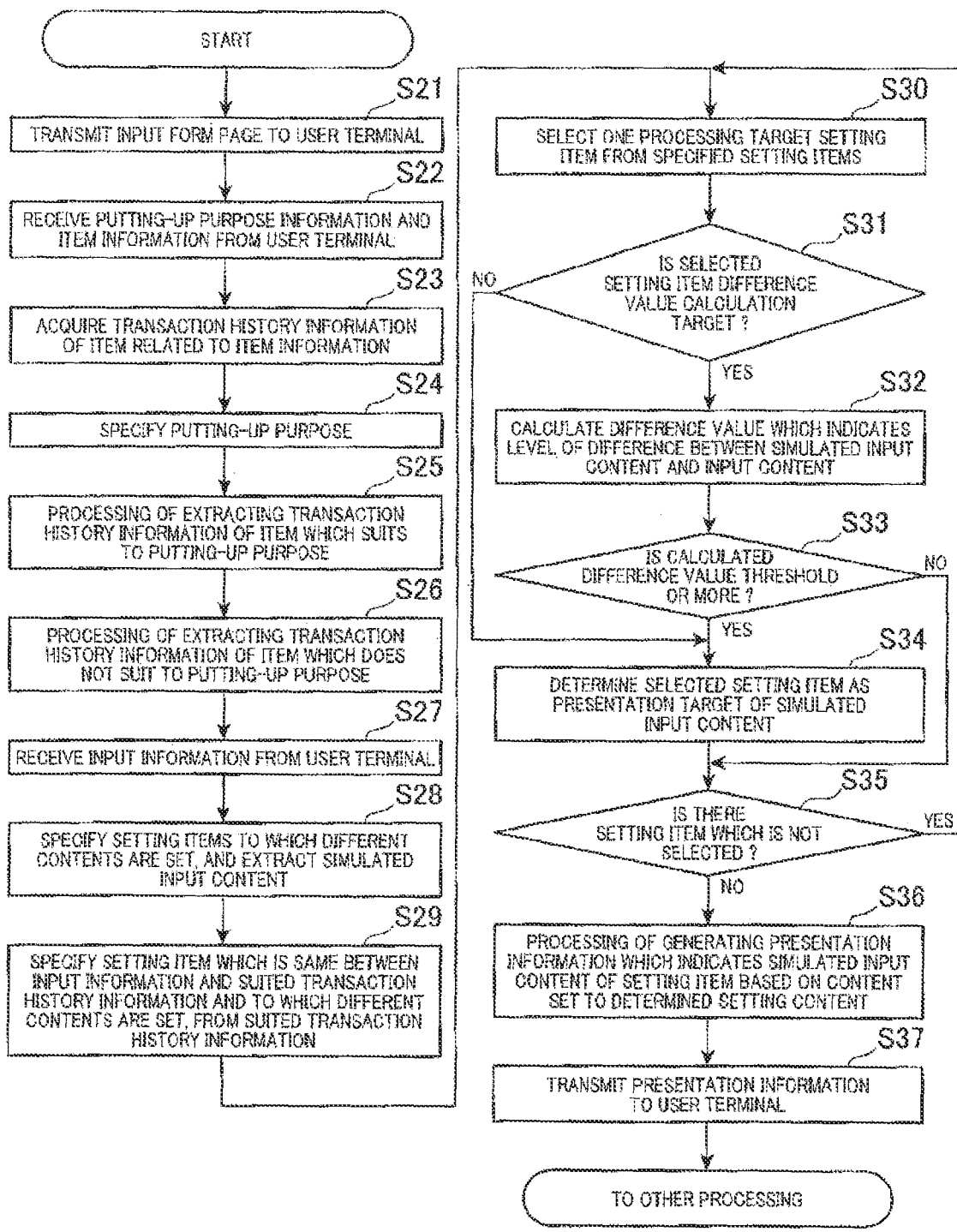
FIG. 9 is a flowchart illustrating a part of putting-up processing in a system control unit 4 of an auction processing server SA according to Embodiment 3.

Next, putting-up processing in an auction according to Embodiment 3 will be described using, for example, FIG. 9. This Embodiment 3 is an example where presentation information is generated by checking validity of input contents input by a seller using transaction history information of an item which suits to a putting-up purpose. FIG. 9 is a flowchart illustrating part of putting-up processing in a system control unit 4 of an auction processing server SA according to Embodiment 3. In addition, processing in step S21 to step S26 is the same as processing in step S11 to step S16 illustrated in FIG. 7, and therefore will not be described.

According to Embodiment 3, the same processing of extracting transaction history information of an item which does not suit to a putting-up purpose as that in Embodiment 2 is performed in step S26 illustrated in FIG. 9, and then the system control unit 4 of the auction processing server SA stands by for reception of input information from a user terminal T1. In addition, this stands by times out when a predetermined time passes.

Further, when the seller inputs putting-up conditions to at least part of a plurality of setting items in a setting item input portion 51b illustrated in FIG. 5 using an operating unit, the user terminal T1 transmits input information which indicates input contents input by the seller, to the auction processing server SA through a network NW. Meanwhile, a configuration may be employed where input information is transmitted every time, for example, putting-up conditions are input to one or a plurality of setting items may be employed or may be configured to be transmitted when the seller designates a check button 51c provided to an input form page 51. Meanwhile, a configuration may be employed where, in case that input information is transmitted when the seller designates the check button 51c, if the seller designates the check button 51c, the user terminal T1 transmits putting-up purpose information which indicates an input putting-up purpose and item information which indicates an input genre and item name, and the input information to the auction processing server SA.

Thus, when receiving the input information from the user terminal T1 (step S27), the system control unit 4 of the auction processing server SA specifies a setting item which is the same setting item between the suited transaction history information and the unsuited transaction history information and to which different contents are set, and extracts content set to the specified setting item in the suited transaction history information as a sample of input content (step S28). According to this processing, the setting item which influences the putting-up purpose is specified, and the sample of input content of the setting item is extracted. In addition, a method of extracting a sample of input contents is the same as that in Embodiment 1 or 2.

Next, the system control unit 4 specifies from suited transaction history information a setting item which is the same setting item between the input information received in above step S27 and suited transaction history information extracted in above step S25 and is specified in above step S28, and to which different contents are set (step S29). That is, a setting item for which input content actually input by the seller and a sample of input content are different among setting items which influence the putting-up purpose is specified.

In addition, a configuration may be employed where, in step S29, the system control unit 4 specifies from suited transaction history information a setting item which is the same setting item between the input information received in above step S27 and suited transaction history information extracted in above step S25, and to which different contents are set (that is, no unsuited transaction history information is used). In this case, it is not necessary to perform processing in above step S26, and, in above step S28, it is not necessary to specify a setting item which is the same setting item between suited transaction history information and unsuited transaction history information, and to which different contents are set.

Next, one processing target setting item is selected from the setting items specified in above step S29 (step S30). In addition, a selection item may be selected at random or may be selected in order of identification numbers assigned to each setting item.

Next, the system control unit 4 determines whether or not the setting item selected in above step S30 is a difference value calculation target setting item (step S31). When, for example, content to be set is represented by a value such as a price or a time, it is determined that the setting item is the difference value calculation target setting item. Meanwhile, when content to be set is represented by yes or no and is not represented by a value, it is determined that the setting item is not the difference value calculation target setting item. Further, when it is determined that the setting item selected in above step S30 is the difference value calculation target setting item (step S31: YES), the flow proceeds to step S32. Meanwhile, when it is determined that the setting item selected in above step S30 is not the difference value calculation target setting item (step S31: NO), the system control unit 4 determines the setting item selected in above step S30 as a presentation target of a sample of input content (step S34) and the flow proceeds to step S35.

In addition, a configuration may be employed where, when the setting item selected in above step S30 is the difference value calculation target setting item, the flow does not proceed to step S32 and proceeds to step S34 such that the setting item is determined as a presentation target of a sample of input content.

In step S32, the system control unit 4 calculates a difference value which indicates a level of difference between the sample of input content of the setting item selected in above step S30 and input content input to the same setting item as this setting item (input content indicated by the input information received in above step S27). When, for example, the setting item is a start price or a buy it now price, a price difference between a sample of input content and input content is calculated as a difference value. Further, when, for example, the setting item is a start time or an end time, a time difference between a sample of input content and input content is calculated as a difference value.

Next, the system control unit 4 determines whether or not the difference value calculated in above step S32 is a threshold or more (step S33). That is, whether or not a difference between input content input by the seller and a sample of input content is a threshold or more is determined. This threshold is determined per setting item. Further, when it is determined that the difference value is the threshold or more (step S33: YES), the system control unit 4 determines the setting item selected in above step S30 as a presentation target of a sample of input content (step S34), and the flow proceeds to step S35. Meanwhile, when it is determined that the difference value is not the threshold or more (step S33: NO), the setting item selected in above step S30 is not determined as a presentation target of a sample of input content, and the flow proceeds to step S35. This is to, when the difference between input content and a sample of input content is small to such a degree that a putting-up purpose is not influenced, avoid complication by not presenting a sample of input content to the seller.

In step S35, the system control unit 4 determines whether or not there is a setting item which is not yet selected in step S30 among the setting items specified in above step S29. Further, when it is determined that there is a setting item which is not yet selected (step S35: YES), the system control unit 4 returns to step S30, selects the setting item which is not yet selected as a processing target setting item and performs processing subsequent to step S31 in the same way as the above. Meanwhile, when it is determined there is no setting item which is not yet selected (step S35: NO), the flow proceeds to step S36.

In step S36, the system control unit 4 performs processing of generating presentation information which indicates a sample of input contents of setting items based on contents set to the setting items determined as a presentation target of the sample of input contents in step S34. For example, the system control unit 4 generates presentation information which indicates a sample of input contents of setting items determined as a presentation target, and which indicates attention messages (an example of information which urges attention) which urge the seller to pay attention upon input. This presentation information is, for example, data which displays the sample of input contents and the attention messages in the vicinities of entry fields (entry fields which display input contents input by the seller) matching the setting items provided in the setting item input portion 51*b* of the input form page 51. Meanwhile, the above attention messages may not be indicated in the presentation information.

In addition, a configuration is employed in some cases where, when the seller designates the check button 51*c* in the input form page 51, the user terminal T1 transmits the above input information to the auction processing server SA. In this case, the generated presentation information may be a confirmation page for confirming input contents input to the entry fields matching the setting items provided in the setting item input portion 51*b* in the input form page 51, and may be a confirmation page which indicates a sample of input contents of the input contents and the attention messages.

Further, the system control unit 4 transmits the presentation information generated in above step S36 to the user terminal T1 through the network NW (step S37).

Thus, when receiving presentation information, the user terminal T1 embeds this presentation information in structured document of the input form page 51, and displays the above sample of input contents and the attention messages in the vicinities of the entry fields (or selection fields) matching setting items indicated in the presentation information. FIG. 10 is a view illustrating a display example of an input form page which displays the sample of input contents and the attention messages according to Embodiment 3. In an example illustrated in FIG. 10, attention messages including a sample of input content are displayed in the vicinities of entry fields matching a start price and a delivery method. In the example in FIG. 10, portions of "Attention!! Start price" and "would better start from" are attention messages, and a portion of "1 yen" is a sample of input content. Further, portions of "Attention!!" and "would better start" are attention messages, and a portion of "shipping free" is a sample of input content. In addition, descriptions of "Attention!! Start price would better start from 1 yen" and "Attention!! Free shipping would be better" are attention messages including sample of input content. In addition, a configuration may be employed where, together with these attention messages or instead of the messages, a mark which urges attention upon input (such as a figure or a picture) is displayed or a distinct color (for example, red) different from the other portions is used for a background color of entry fields (selection fields) of setting items of a presentation target of sample of input contents. These mark and distinct color are examples of information which urge attention.

In addition, a configuration may be employed where a sample of input content and attention messages are displayed when, for example, a mouse is placed over entry fields matching these contents or the position in the vicinity of the entry field.

Further, the seller confirms the sample of input content and the attention messages displayed in the entry fields (or selection fields) as illustrated in FIG. 10, and changes input contents where necessary. Then, the seller proceeds to the next step and performs an operation of finally determining putting-up of an item to set input content input to each entry field to each setting item.

As described above, according to Embodiment 3, when a seller puts up an item, presentation information which indicates a sample of input contents of setting items which are the same setting items between input information which indicates input contents input by the seller and the suited transaction history information, and to which different contents are set is generated, and the presentation information is transmitted to the terminal device T1 of the seller, so that it is possible to effectively present, to a seller, input contents which do not suit to the putting-up purpose among the input contents input to the setting items by the seller and a model sample of input contents. Further, according to a configuration of presenting the sample of input content and the attention messages to the seller, it is possible to effectively urge the seller to pay attention upon input.

In addition, when, for example, a genre of an item is a predetermined setting item in the suited transaction history information, content set to the genre is extracted as a sample of input content, and can be presented to a seller. By this means, when, for example, the genre of the item input by the seller is inadequate, it is possible to effectively present a sample of input content which indicates an adequate genre to the seller.

Embodiment 4

Next, putting-up processing in an auction according to Embodiment 4 will be described. This Embodiment 4 is an example where transaction history information matching an attribute of a seller is extracted by extraction processing according to Embodiments 1 to 3. According to Embodiment 4, upon extraction processing in above step S5, "step S15 or S16" or "step S25 or S26", a system control unit 4 of an auction processing server SA determines which attribute of a business operator or an individual a current seller who uses a user terminal T1 and logs in (a user of the user terminal T which transmits item information in above step S2, S12 or S22) has, and which attribute of a business operator and an individual a seller of an item indicated in transaction history information acquired in above step S3, S13 or S23 has per transaction history information. Meanwhile, which attribute of a business operator and an individual the seller has is determined based on whether or not the number of put-up items put up by the seller in a predetermined period (for example, one week) is a predetermined number (for example, 100) or more referring to, for example, past transaction history information of the seller. In addition, when information which indicates whether the seller is an individual or a business operator is associated with a user ID and registered in a user information database 21, it is possible to determine which attribute of a business operator and an individual the seller has from this information.

Further, the system control unit 4 extracts transaction history information of an item which was put up in the past by another seller whose attribute is the same as that of the current seller who uses the user terminal T1 and which suits to the above putting-up purpose as suited transaction history information (extracts suited transaction history information and transaction history information which does not suit to the putting-up purpose as unsuited transaction history information in Embodiment 2 or Embodiment 3). When, for example, the current seller who uses the user terminal T1 is an individual, transaction history information of an item put up in the past by another seller who is an individual is an extraction target. Meanwhile, when, for example, the current seller who uses the user terminal T1 is a business operator, transaction history information of an item put up in the past by another seller who is a business operator is an extraction target. This takes into account that, when, for example, a seller is an individual, presenting a sample of input contents extracted from transaction history information of a business operator to the seller is not adequate (for example, there is content which cannot be used by an individual such as a delivery method unique to the business operator). In addition, processing subsequent to extraction processing is the same as those in Embodiments 1 to 3.

As described above, according to Embodiment 4, by extracting transaction history information matching an attribute of a seller, it is possible to present a more adequate sample of input contents matching an attribute of the seller, to the seller.

In addition, a configuration may be employed where, instead of, upon the above extraction processing, determining which attribute of a business operator or an individual a seller has and extracting transaction history information of an item put up in the past by another seller whose attribute is the same as that of the seller, upon processing in above step S3, S13 or S23, which attribute of a business operator or an individual the seller has is determined and transaction history information of an item which is put up in the pasted by another seller whose attribute is the same as that of the seller and which relates to the item information is acquired from the auction database 22, and, in this case, it is possible to provide the same effect as the above.

Embodiment 5

Next, putting-up processing in an auction according to Embodiment 5 will be described. This Embodiment 5 is an example where, according to extraction processing in Embodiments 1 to 3, an item which is set to be displayed in a more distinct mode than other items and an item to which this setting is not applied are distinguished to extract transaction history information. According to Embodiment 5, upon extraction processing in above step S5, "step S15 or S16" or "step S25 or S26", a system control unit 4 of an auction processing server SA excludes, from an extraction target, transaction history information of an item which is set to be displayed in a more distinct mode than the other items referring to the transaction history information acquired in above step S3, S13 or S23, and extracts transaction history information which suits to the putting-up purpose as suited transaction history information (extracts suited transaction history information and, in addition, transaction history information which does not suit to the putting-up purpose as unsuited transaction history information in Embodiment 2 or Embodiment 3). An example of a setting of displaying an item in a more distinct mode than the other items is a hot auction setting, a put-up item advertisement setting and a setting of highlighting item information as described above. Transaction history information of an item to which such a setting is applied has a direct significant influence on a putting-up purpose and can be hardly used as a reference. Therefore, the transaction history information of the item to which this setting is applied is excluded. Meanwhile, the above configuration is effective when the current seller who uses the user terminal T1 and logs in does make no setting of the hot auction setting, the put-up item advertisement setting and the setting of highlighting item information. However, when a setting of displaying an item in a more distinct mode than the other items is made (when, for example, the hot auction setting: yes is indicated in, for example, information received from the user terminal T1), contrary to the configuration, it is effective to configure the system control unit 4 to extract only transaction history information of an item which is set to be displayed in a more distinct mode than the other items as suited transaction history information from the transaction history information acquired in step S3, S13 or S23 (the same applies in case of unsuited transaction history information) and coordinate putting-up mode conditions. In addition, processing subsequent to extraction processing is the same as those in Embodiments 1 to 3.

As described above, according to Embodiment 5, by extracting transaction history information taking into account a setting of displaying an item to be displayed in a more distinct mode than the other items, it is possible to present a more adequate sample of input contents matching a putting-up mode, to the seller.

In addition, a configuration may be employed where, instead of, upon the extraction processing, excluding, form an extraction target, transaction history information of an item which is set to be displayed in a more distinct mode than the other items, upon processing in above step S3, S13 or S23, transaction history information of an item set to be displayed in a more distinct mode than the item items is excluded from an extraction target to acquire transaction history information of an item related to the above item information, from auction database 22, and, in this case, it is possible to provide the same effect. Further, a configuration may be employed where the configuration according to Embodiment 4 and the configuration according to Embodiment 5 are combined.

Embodiment 6

Next, putting-up processing in an auction according to Embodiment 6 will be described. This Embodiment 6 is an example where transaction history information related to an item which includes part or entirety of item information is acquired as transaction history information which is an acquisition target in step S3, S13 or S23 in Embodiments 1 to 5 (that is, transaction history information of an item related to received item information). An item which is sold at a store includes a main item and an accessory attached to this main item. In addition, the item including the main item and the accessory is referred to as a "set item". Meanwhile, an accessory includes, for example, a "gift" accompanying a main item "sweets", or a "poster" or a "postcard" attached to a main item "optical disk" shipped as a limited initial edition.

Further, when, for example, the seller puts up a set item, in above step S3, S13 or S23, a system control unit 4 of an auction processing server SA acquires transaction history information of the set item, transaction history information of only a main item included in the set item and transaction history information of only an accessory included in the set item from the auction database 22 as transaction history information related to an item which includes part or the entirety of item information of the set item. Meanwhile, an item name of the set item and description of an item includes an item name of a main item and an item name of an accessory in some cases. Then, the system control unit 4 can extract an item name of a main item and an item name of an accessory from the item name of the set item or description of the item (alternatively, may extract from transaction history information of another set item), and acquire transaction history information using the extracted item name as a key. Next, the system control unit 4 extracts transaction history information which suits to the putting-up purpose (for example, successful bidding price maximization) as suited transaction history information from a plurality of acquired transaction history information, compares a plurality of extracted suited transaction history information and specifies suited transaction history information which suits to the putting-up purpose the most. For example, the system control unit 4 compares a successful bidding price of the set item, a successful bidding price of the main item and a successful bidding price of the accessory, and, when putting-up the main item and the accessory separately provides a higher price putting-up the set item (for example, a total price of the successful bidding price of the main item and the successful bidding price of the accessory is higher than the successful bidding price of the set item), specifies transaction history information of only the main item and transaction history information of only the accessory as suited transaction history information which suits to the putting-up purpose the most. Next, the system control unit 4 generates presentation information which indicates a sample of input contents of the setting items based on the specified suited transaction history information. For example, presentation information which indicates a sample of input contents including only the item name of the main item or only the item name of only the accessory is generated.

Meanwhile, when, for example, the seller puts up only a main item of the set item, in above step S3, S13 or S23, the system control unit 4 of the auction processing server SA acquires transaction history information of the set item and transaction history information of only the main item from the auction database 22 as transaction history information related to an item which includes the entirety of item information of the main item. Next, the system control unit 4 extracts transaction history information which suits to the putting-up purpose (for example, successful bidding price maximization) as suited transaction history information from a plurality of acquired transaction history information, compares a plurality of extracted suited transaction history information and specifies suited transaction history information which suits to the putting-up purpose the most. For example, the system control unit 4 compares a successful bidding price of a set item and a successful bidding price of a main item and, when putting-up the set item provides a higher price putting-up only the main item, specifies transaction history information of only the set item as suited transaction history information which suits to the putting-up purpose to the most. Next, the system control unit 4 generates presentation information which indicates a sample of input contents of the setting items based on the specified suited transaction history information. For example, presentation information which indicates a sample of input contents including only the item name of the set item is generated.

Meanwhile, when, for example, the seller puts up only the accessory of the set item, in above step S3, S13 or S23, the system control unit 4 of the auction processing server SA acquires transaction history information of the set item and transaction history information of only the accessory from the auction database 22 as transaction history information related to an item which includes the entirety of item information of the accessory. Next, the system control unit 4 extracts transaction history information which suits to the putting-up purpose (for example, successful bidding price maximization) as suited transaction history information from a plurality of acquired transaction history information, compares a plurality of extracted suited transaction history information and specifies suited transaction history information which suits to the putting-up purpose the most. For example, the system control unit 4 compares a successful bidding price of the set item and a successful bidding price of the accessory and, when putting-up the set item provides a higher price putting-up only the accessory, specifies transaction history information of only the set item as suited transaction history information which suits to the putting-up purpose to the most. Next, the system control unit 4 generates presentation information which indicates a sample of input contents of the setting items based on the specified suited transaction history information. For example, presentation information which indicates a sample of input contents including only the item name of the accessory is generated.

Further, when the seller puts up a book (printed book) the first to X-th volumes (X: a natural number equal to or more than 2) of which are published, the seller puts up a plurality of volumes of books (for example, all volumes) in some cases or puts up a book volume by one volume. When, for example, the seller puts up a plurality of volumes of books at a time, in above step S3, S13 or S23, the system control unit 4 of the auction processing server SA acquires transaction history information of books which are put up at a time as a plurality of volumes and transaction history information of books which are published volume by one volume from the auction database 22 as transaction history information related to an item which includes the entirety or part of item information of the books. Next, the system control unit 4 extracts transaction history information which suits to the putting-up purpose (for example, successful bidding price maximization) as suited transaction history information from a plurality of acquired transaction history information, compares a plurality of extracted suited transaction history information and specifies suited transaction history information which suits to the putting-up purpose the most. For example, the system control unit 4 compares successful bidding prices of the books which are put up at a time as a plurality of volumes and successful bidding prices of the books which are put up volume by one volume and, when putting-up books volume by one volume provides a higher price putting-up a plurality of volumes at a time (when, for example, a successful bidding price of the third volume is higher than those of the other volumes), specifies transaction history information of a book of a given volume which is put up as suited transaction history information which suits to the putting-up purpose the most. Next, the system control unit 4 generates presentation information which indicates a sample of input contents of the setting items based on the specified suited transaction history information. For example, presentation information which indicates a sample of input contents including only a volume number of a given volume (for example, acquired from description of an item) is generated.

As described above, according to Embodiment 6, it is possible to present to the seller which one of putting-up modes of putting-up a main item alone, putting-up an accessory alone and putting-up a set item suits to a putting-up purpose as a sample of input contents. Further, it is possible to present to the seller which one of putting-up modes of putting-up books volume by one volume and putting-up a plurality of volumes of books at a time suits to a putting-up purpose as a sample of input contents.

Embodiment 7

Next, putting-up processing in an auction according to Embodiment 7 will be described. This Embodiment 7 is an example where, in step S4, S14 or S24 according to Embodiments 1 to 6, a system control unit 4 specifies a seller's putting-up purpose. According to Embodiment 7, the putting-up purpose is specified without seller's explicit designation of the putting-up purpose, and therefore is referred to as estimation of the putting-up purpose. In this case, a putting-up purpose input portion 51a is not provided in an input form page 51 and, therefore, in above step S2, S12 or S22, putting-up purpose information is not transmitted from a user terminal T1 (item information, or item information and input information are transmitted). The putting-up purpose is estimated based on attribute information which indicates an attribute of a buyer of an item in some cases and based on input information which indicates input contents input to setting items by a seller.

First, a case will be described where the putting-up purpose is estimated based on attribute information which indicates the attribute of the buyer of the item. In this case, the system control unit 4 of the auction processing server SA acquires a user ID of the buyer of the item from each transaction history information acquired in above step S3, S13 or S23. Meanwhile, the buyer is at least one of a bidder or a successful bidder of the item. Further, the system control unit 4 acquires attribute information which indicates attributes (such as the age, the sex and the hobby) of each buyer from a user information database 21 using acquired user ID as a key. Next, the system control unit 4 estimates a putting-up purpose based on attribute information which indicates the attributes of each buyer. For example, the system control unit 4 calculates the number of people per group age (for example, an "age group of 15 years old to 18 years old", an "age group of 19 years old to 59 years old" and an "age group of 60 years old or more") including the age of each buyer. When, for example, the number of people in the "age group of 15 years old to 18 years old" is the highest, the putting-up purpose "to sell items for junior high school students" is determined. Meanwhile, when, for example, the number of people in the "age group of 60 years old or more" is the highest, the putting-up purpose "to sell items for old people" is determined. Further, as an example, the system control unit 4 calculates the number of people per sex of each buyer, and estimates the putting-up purpose according to the sex the number of which is the highest. When, for example, the number of men is higher than the number of women, the putting-up purpose "to sell items for men" is determined. Further, as another example, the above age groups are classified based on the sex (into an "age group of men of 15 years old to 18 years old", an "age group of women of 15 years old to 18 years old", an "age group of men of 60 years old or more" and an "age group of women of 60 years old or more"), the number of people is calculated per age group and the putting-up purpose is estimated according to the age group the number of people of which is the highest. When, for example, the number of people in the "age group of men of 60 years old or more" is the highest, the putting-up purpose "to sell items for old men" is determined. In addition, a configuration may be employed where the system control unit 4 calculates the number of people per hobby of each buyer (for example, travel, music or movie), and estimates a putting-up purpose (to sell items for, for example, people who are interested in travel) according to the hobby the number of people of which is the highest.

Next, a case will be described where a putting-up purpose is estimated based on input information which indicates input contents input to setting items by a seller. In this case, in above step S2, S12 or S22, the system control unit 4 of the auction processing server SA receives item information of an item to be put up and input contents input by the seller, from the user terminal T1. In addition, the item information and the input information may be transmitted together at the same timing from the user terminal T1 or may be transmitted at different timings. Further, the input information in this case is input information which is required to specify a putting-up purpose, and is, for example, input information which indicates input contents input to setting items (for example, a start price, a buy it now price, a reserve price, a start time and an end time) to set at least one of the price or the time. Furthermore, a configuration may be employed where the input information which is required to specify a putting-up purpose is transmitted when a seller designates a transmission button provided to the input form page 51 or when predetermined input contents required to specify a putting-up purpose are input. Still further, when receiving the input information, the system control unit 4 acquires a value which indicates a price (for example, the buy it now price, the start price or the reserve price) of the item to be put up, from the input information, compares the value which indicates the acquired buy it now price (or the start price or the reserve price) and a first threshold, and estimates the putting-up purpose based on a relation as to which one of the value and the first threshold is higher. This first threshold is a value which is acquired from a successful bidding market price database 23 and which indicates a market price (successful bidding market price) of an item to be put up. While, when, for example, the buy it now price is higher than the market price, the putting-up purpose is determined as "successful bidding price maximization", when the buy it not price is lower than the market price, the putting-up purpose is determined as "sellout". Further, as another example, the system control unit 4 acquires a value which indicates a putting-up period from the input information, compares the value which indicates the acquired putting-up period and a second threshold, and estimates the putting-up purpose based on a relationship as to which one of the value and the second threshold is higher. This second threshold is, for example, a value which indicates an average putting-up period (referred to as an "average putting-up period" below) of an item to be put up. Further, the putting-up period is a period between the start time and the end time included in the input information. When, for example, the average putting-up period is shorter than the putting-up period, the putting-up purpose is determined as "early bidding". In addition, a configuration may be employed where the system control unit 4 estimates a putting-up purpose based on a relationship as to which one of a value which indicates a price of an item and the first threshold is higher and a relationship as to which one of a value which indicates a putting-up period and a second threshold is higher. While, when, for example, the buy it now price is higher than the market price and the average putting-up period is longer than the putting-up period, the putting-up purpose is determined as "successful bidding price maximization", in other cases, the putting-up purpose is determined as "sellout".

When the putting-up purpose is estimated as described above, transaction history information of an item which suits to the putting-up purpose is extracted in the same way as in Embodiment 1 to Embodiment 6, presentation information which indicates a sample of input contents of the setting items is generated based on the extracted suited transaction history information, and the presentation information is transmitted to the user terminal T1.

As described above, according to Embodiment 7, it is possible to estimate a putting-up purpose of an item without seller's explicit designation of the purpose and, consequently, the seller can skip a labor of thinking and designating a putting-up purpose.

In addition, although, according to Embodiment 7, a sample of input contents of predetermined setting items are presented to the seller without seller's explicit designation of a putting-up purpose, presenting a sample of input contents may be assumed to be bothersome for skilled sellers of a putting-up operation. Hence, a configuration may be employed where whether or not to estimate a putting-up purpose is determined based on at least one of the number of times of putting-up of a seller in the past and an immediate putting-up date. For example, the system control unit 4 acquires putting-up information from the auction database 22 using a user ID of the seller (log-in user) as a key. Further, a configuration may be employed where the system control unit 4 calculates the number of times of putting-up of the seller in the past based on the putting-up information, and estimates the putting-up information when the number of times of putting-up is less than a predetermined number of times (for example, three times) and does not estimate the putting-up purpose when the number of times of putting-up is a predetermined number of times or more. In this case, it is possible to prevent a sample of input contents from being presented to sellers whose numbers of times of putting-up are higher. Alternatively, a configuration may be employed where the system control unit 4 acquires an immediate putting-up date from the acquired putting-up information, calculates a period passed between the acquired putting-up date and the current date, and estimates the putting-up purpose when the period passed is a predetermined period (for example, 30 days) or more and does not estimate the putting-up purpose when the period passes is less than the predetermined period. In this case, it is possible to prevent a sample of input contents from being presented to a seller who puts up items with a little time passed from the last time the seller put up an item.

Further, although an auction has been described an example of electronic commercial transaction in the above embodiment, the present invention is applicable when stores put up items for trading of items at, for example, shopping sites other than auctions.

REFERENCE SIGNS LIST

1 COMMUNICATION UNIT
2 MEMORY UNIT
3 INPUT/OUTPUT INTERFACE UNIT
4 SYSTEM CONTROL UNIT
5 SYSTEM BUS
Tn USER TERMINAL
SA AUCTION PROCESSING SERVER
NW NETWORK

The invention claimed is:
1. An auction processing server comprising:
a network communication interface configured to communicate over a network with a plurality of user terminal devices;
at least one memory that stores a database comprising:
transaction histories of a plurality of goods previously listed for auction and program code; and
at least one processor operable to read the program code and operate as instructed by the program code, wherein the program code includes:
first program code configured to control at least one of the at least one processor to, in response to receiving, over the network via the network communication interface from a user terminal device, an auction listing page request automatically transmit, over the network via the network communication interface to the user terminal device, first auction user interface information that controls the user terminal device to display an auction listing user interface, the auction listing user interface including two user input portions, the two user input portions including a user auction listing purpose input portion and a sale parameter user input portion, the user auction listing purpose input portion being switchable between two or more predetermined selectable auction listing purpose candidates, the two or more predetermined selectable auction listing purpose candidates including a purpose of maximizing a selling price, and one or more of: a purpose of obtaining an early bid for a good to be auctioned, a purpose of selling out the good to be auctioned, or a purpose of selling the good to be auctioned to a specific type of user; and
second program code configured to control at least one of the at least one processor to, in response to receiving, over the network via the network communication interface from the user terminal device, a selection of one auction listing purpose of the two or more predetermined selectable auction listing purpose candidates and good information input by a user related to a good to be auctioned: (A) immediately identify, without human interaction, a sample of input content of a listing parameter that is suitable for the selected one auction listing purpose, and (B) control the network communication interface to automatically transmit, over the network via the network via the network communication interface to the user terminal device, second auction user interface information that controls the user terminal device to immediately update, without human interaction, the auction listing user interface displayed by the user terminal device, and immediately display, without human interaction, the identified sample of input content,
wherein the immediate identifying of the sample of input content includes:
automatically acquiring, from the database, transaction histories of all goods having good information that entirely or partially matches the received good information of the good to be auctioned, partially matching meaning matching above a predetermined matching threshold;
automatically extracting, from the acquired transaction histories, a plurality of pieces of suited transaction history information that suit the selected one auction listing purpose; and
automatically extracting, from the plurality of pieces of suited transaction history information that suit the selected one auction listing purpose, the sample of input content, which is a common sale parameter that is common among two or more of the pieces of suited transaction history information that suit the selected one auction listing purpose, and the second program code is further configured to control at least one of the at least one processor to: automatically generate the second auction user interface information that controls the user terminal device to immediately update, without human interaction, the auction listing user interface and immediately display, without human interaction, the identified sample of input content of the common sale parameter in the sale parameter input portion of the auction listing user interface or in a vicinity of the sale parameter input portion, prior to the automatic transmitting of the second auction user interface information, wherein the pieces of suited transaction history information that suit the selected one auction listing purpose are pieces of the acquired transaction history information that correspond to one of:
  (a) an item that has a highest successful bidding price or is one of the highest ranked items in terms of successful bidding price, when the selected one auction listing purpose is the purpose of maximizing the selling price,
  (b) an item which has a shortest time from an auction listing start date to a first bidding date or is one of the highest ranked items in terms of shortest time from the auction listing start date to the first bidding date, when the selected one auction listing purpose is the purpose of obtaining the early bid for the good to be auctioned,
  (c) an item which has a lowest start price or is one of the highest ranked items in terms of lowest start price, from among items which have start prices, when the selected one auction listing purpose is the purpose of selling out the good to be auctioned, or
  (d) an item which has been successfully bid on by the specific type of user, when the selected one auction listing purpose is the purpose of selling the good to be auctioned to the specific type of user.

2. The auction processing server according to claim 1, wherein
the second program code is further configured to control at least one of said at least one processor to:
  extract unsuited transaction history information of at least one item related to the good to be auctioned which does not suit the selected one auction listing purpose as unsuited transaction history information; and
  specify a plurality of sale parameters based on the extracted unsuited transaction history information; and
control the communication interface to transmit, via the network communication interface, the second auction user interface information that includes at least one of the plurality of sale parameters and the sample of input content identified for the at least one of the plurality of sale parameters, to the user terminal device,
wherein the unsuited transaction history information is based on opposite conditions from the conditions for determining the suited transaction history information that suits the selected one auction listing purpose, the opposite conditions causing the unsuited transaction history information to be based on one of: a lowest successful bidding price, a longest start time or a highest start price.

3. The auction processing server according to claim 2, wherein the second auction user interface information enables the user to compare the sample of input content of the common sale parameter with the plurality of sale parameters.

4. The auction processing server according to claim 1, wherein the second program code is further configured to control at least one of said at least one processor to:
  receive input information which indicates input content input to at least a part of a setting item by the user, from the user terminal device;
  specify, from the suited transaction history information, the setting item which is a same setting item between the received input information and the extracted suited transaction history information, and to which different content is set;
  generate the second auction user interface information that indicates a sample setting item set to the specified setting item; and
  control the network communication interface to transmit the second auction user interface information that indicates the sample setting item.

5. The auction processing server according to claim 1, wherein the second program code is further configured to control at least one of said at least one processor to:
  extract unsuited transaction history information of another item which does not suit to the selected one auction listing purpose as unsuited transaction history information;
  specify a setting item that is the same between the extracted suited transaction history information and the extracted unsuited transaction history information;
  generate the second auction user interface information that indicates a sample setting item set to the specified setting item; and
  control the network communication interface to transmit the second auction user interface information that indicates the sample setting item.

6. The auction processing server according to claim 5, wherein the second program code is further configured to control at least one of said at least one processor to:
  calculate a difference value which indicates a level of difference between content set to the specified setting item and input content input to a same setting item input portion of the auction listing user interface as the specified setting item,
  determine whether or not the calculated difference value is a difference threshold or more; and
  when the difference value is determined to be the difference threshold or more, generate and transmit the second auction user interface information to the user terminal device.

7. The auction processing server according to claim 1, wherein the second auction user interface information urges a seller to pay attention to an input.

8. The auction processing server according to claim 1, wherein the immediate identifying of the sample of input content includes identifying the suited transaction history information which suits to the selected one auction listing purpose the most, as the suited transaction history information, from among the acquired transaction histories.

9. The auction processing server according to claim 4, wherein the immediate identifying of the sample of input content includes identifying the suited transaction history information which suits to the selected one auction listing purpose the most, as the suited transaction history information, from among the acquired transaction histories.

10. The auction processing server according to claim 1, wherein the immediate identifying of the sample of input content includes extracting a plurality of pieces of the transaction history information that suit the selected one auction listing purpose and which is a predetermined ranking order or higher, as the suited transaction history information, from the acquired transaction histories.

11. The auction processing server according to claim 1, wherein the immediate identifying of the sample of input content includes extracting a plurality of pieces of the transaction history information which that suits the selected one auction listing purpose and which is a predetermined ranking order or higher, as the suited transaction history information, from the acquired transaction histories.

12. The auction processing server according to claim 10, wherein the second program code is further configured to control at least one of said at least one processor to:
specify, from the suited transaction history information, a setting item which is a same setting item between the received input information and the extracted suited transaction history information, and to which is the predetermined ranking order or higher, and to which content which is common at a predetermined rate or more is set;
generate the second auction user interface information that indicates a sample setting item set to the specified setting item; and
control the network communication interface to transmit the second auction user interface information that indicates the sample setting item.

13. The auction processing server according to claim 11, wherein the second program code is further configured to control at least one of said at least one processor to:
specify, from the suited transaction history information, a setting item which is a same setting item between the received input information and the extracted suited transaction history information, and to which is the predetermined ranking order or higher, and to which content which is common at a predetermined rate or more is set;
generate the second auction user interface information that indicates a sample setting item set to the specified setting item; and
control the network communication interface to transmit the second auction user interface information that indicates the sample setting item.

14. The auction processing server according to claim 1, wherein the suited transaction history information includes transaction history information of an item listed in the past by another seller who has one or more similar or same attributes as the user of the user terminal device.

15. The auction processing server according to claim 4, wherein the suited transaction history information includes transaction history information of an item listed in the past by another seller who has one or more similar or same attributes as the user of the user terminal device.

16. The auction processing server according to claim 1, wherein transaction history information of an item which is set to be displayed in a more distinct mode than other items, is excluded as an extraction target.

17. The auction processing server according to claim 1, wherein the suited transaction history information includes information that is extracted based on attribute information which indicates an attribute of a buyer of an item included in the suited transaction history information.

18. An auction processing server control method comprising:
in response to receiving, over a network via a network communication from a user terminal device, an auction listing page request automatically transmit, over the network via the network communication interface to the user terminal device, first auction user interface information that controls the user terminal device to display an auction listing user interface, the auction listing user interface including two user input portions, the two user input portions including a user auction listing purpose input portion and a sale parameter user input portion, the user auction listing purpose input portion being switchable between two or more predetermined selectable auction listing purpose candidates, the two or more predetermined selectable auction listing purpose candidates including a purpose of maximizing a selling price, and one or more of: a purpose of obtaining an early bid for a good to be auctioned, a purpose of selling out the good to be auctioned, or a purpose of selling the good to be auctioned to a specific type of user; and
in response to receiving, over the network via the network communication interface from the user terminal device, a selection of one auction listing purpose of the two or more predetermined selectable auction listing purpose candidates and good information input by a user related to a good to be auctioned: (A) immediately identify, without human interaction, a sample of input content of a listing parameter that is suitable for the selected one auction listing purpose, and (B) control the network communication interface to automatically transmit, over the network via the network via the network communication interface to the user terminal device, second auction user interface information that controls the user terminal device to immediately update, without human interaction, the auction listing user interface displayed by the user terminal device, and immediately display, without human interaction, the identified sample of input content,
wherein the immediate identifying of the sample of input content includes:
automatically acquiring, from the database, transaction histories of all goods having good information that entirely or partially matches the received good information of the good to be auctioned, partially matching meaning matching above a predetermined matching threshold;
automatically extracting, from the acquired transaction histories, a plurality of pieces of suited transaction history information that suit the selected one auction listing purpose; and
automatically extracting, from the plurality of pieces of suited transaction history information that suit the selected one auction listing purpose, the sample of input content, which is a common sale parameter that is common among two or more of the pieces of suited transaction history information that suit the selected one auction listing purpose, and
the auction server processing method further comprises:
automatically generating the second auction user interface information that controls the user terminal device to immediately update, without human interaction, the auction listing user interface and immediately display, without human interaction, the identified sample of input content of the common sale parameter in the sale parameter input portion of the auction listing user interface or in a vicinity of the sale parameter input portion, prior to the automatic transmitting of the second auction user interface information, and wherein the pieces of suited transaction history information that suit the selected one auction listing purpose are pieces of the acquired transaction history information that correspond to one of:
- (a) an item that has a highest successful bidding price or is one of the highest ranked items in terms of successful bidding price, when the selected one auction listing purpose is the purpose of maximizing the selling price,
- (b) an item which has a shortest time from an auction listing start date to a first bidding date or is one of the highest ranked items in terms of shortest time from the auction listing start date to the first bidding date, when the selected one auction listing purpose is the purpose of obtaining the early bid for the good to be auctioned,
- (c) an item which has a lowest start price or is one of the highest ranked items in terms of lowest start price, from among items which have start prices, when the selected one auction listing purpose is the purpose of selling out the good to be auctioned, or
- (d) an item which has been successfully bid on by the specific type of user, when the selected one auction listing purpose is the purpose of selling the good to be auctioned to the specific type of user.

19. The auction processing server according to claim 1, wherein the sale parameter input portion includes a plurality of sale parameters to list the good for sale on a website.

20. The auction processing server according to claim 1, wherein the second auction user interface information includes information that displays a confirm button, which is a button for proceeding to a confirmation page in which an operation of finally determining listing of an item is performed.

21. The auction processing server control method according to claim 18, wherein the second auction user interface information controls the user terminal device to automatically update the auction listing user interface by embedding the identified sample of input content into the auction listing user interface and automatically display the auction listing user interface with the embedded sample of input content.

* * * * *